United States Patent
Chiba et al.

[19]

[11] Patent Number: 5,880,549
[45] Date of Patent: Mar. 9, 1999

[54] SWITCHED RELUCTANCE ROTATOR

[75] Inventors: Akira Chiba, Ochiai Mansion 707, 1-8-14, Shimo-Ochiai, Shinjuku-ku, Tokyo 161; Tadashi Fukao, 24-45, Matsukaze-Dai, Aoba-ku, Yokohama-shi, Kanagawa-ken, 227; Chikara Michioka, Haitsu Hatano-Dai 909, 2-8-21, Hatano-Dai, Shinagawa-ku, Tokyo 142, all of Japan

[73] Assignees: Akira Chiba, Tokyo; Tadashi Fukao, Kanagawa-ken; Chikara Michioka, Osaka-fu; Nikkiso Company Limited; Ebara Corporation, both of Tokyo; Seiko Seiki Kabushiki Kaisha, Chiba-Ken, all of Japan

[21] Appl. No.: 750,167
[22] PCT Filed: Mar. 29, 1996
[86] PCT No.: PCT/JP96/00860
  § 371 Date: Jan. 16, 1997
  § 102(e) Date: Jan. 16, 1997
[87] PCT Pub. No.: WO96/35257
  PCT Pub. Date: Nov. 7, 1996

[30] Foreign Application Priority Data

Mar. 30, 1995 [JP] Japan .................................. 7-073760

[51] Int. Cl.$^6$ .............................. H02K 19/06; H02K 7/09
[52] U.S. Cl. .......................................... 310/168; 310/90.5
[58] Field of Search .................................. 310/90.5, 179, 310/184, 185, 186, 168, 166

[56] References Cited

U.S. PATENT DOCUMENTS

| | | | |
|---|---|---|---|
| 2,777,105 | 1/1957 | Larsen | 318/611 |
| 3,988,658 | 10/1976 | Meinke et al. | 318/647 |
| 4,683,391 | 7/1987 | Higuchi | 310/90.5 |
| 4,792,710 | 12/1988 | Williamson | 310/90.5 |
| 4,841,204 | 6/1989 | Studer | 310/90.5 |
| 4,947,067 | 8/1990 | Habermann et al. | 310/51 |
| 5,424,595 | 6/1995 | Preston et al. | 310/90.5 |

FOREIGN PATENT DOCUMENTS

| | | | |
|---|---|---|---|
| 2406790 | 5/1975 | Germany | 310/90.5 |
| 2-142385 | 5/1990 | Japan . | |
| 3-22845 | 1/1991 | Japan . | |
| 4-229093 | 8/1992 | Japan . | |
| 4-236188 | 8/1992 | Japan . | |
| 7-508157 | 9/1995 | Japan . | |
| 8-84491 | 3/1996 | Japan . | |

OTHER PUBLICATIONS

Chikara Michioka et al, "A Decoupling Control Method of Reluctance-Type Bearingless Motors Considering Magnetic Saturation", IEEE Transactions on Industry Applications, vol. 32 No. 5, Sep./Oct. 1996, pp. 1204–1210.

Akira Chiba et al, "A Machine Parameter Measurement of Switched Reluctance Machines with Egg–Shaped Diagram", IEEE Transaction on Industry Applicatins, pp. 728–735.

*Primary Examiner*—Clayton LaBalle
*Attorney, Agent, or Firm*—Browdy and Neimark

[57] ABSTRACT

This invention relates to a switched reluctance rotator according to which a rotor can be rotated at a high speed without generating electromagnetic vibration at a rotating shaft and in which a current for generating of torque and a current for generating a radial force are passed through windings on the protruding poles of the stator or a winding for generating torque, and a winding for generating a radial force are wound on the protruding poles of the stator.

16 Claims, 18 Drawing Sheets

FIG. 5
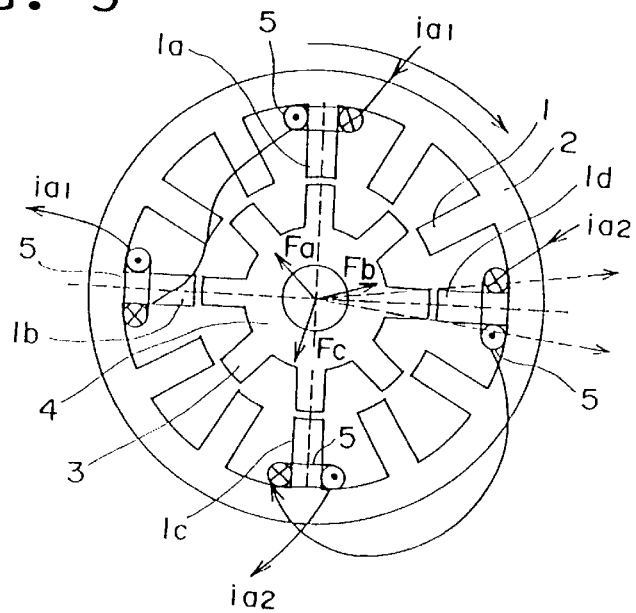
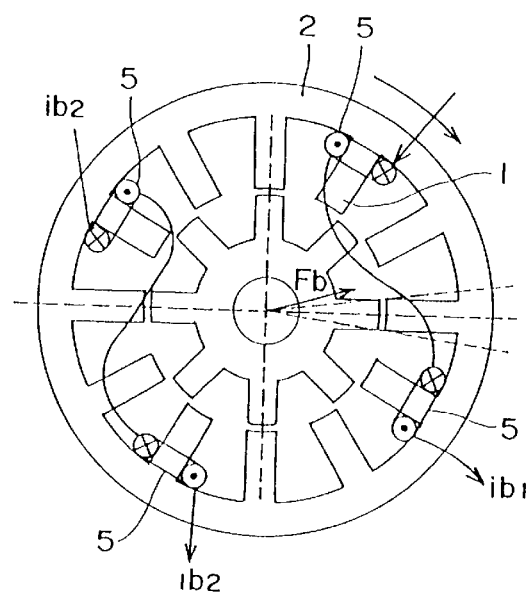
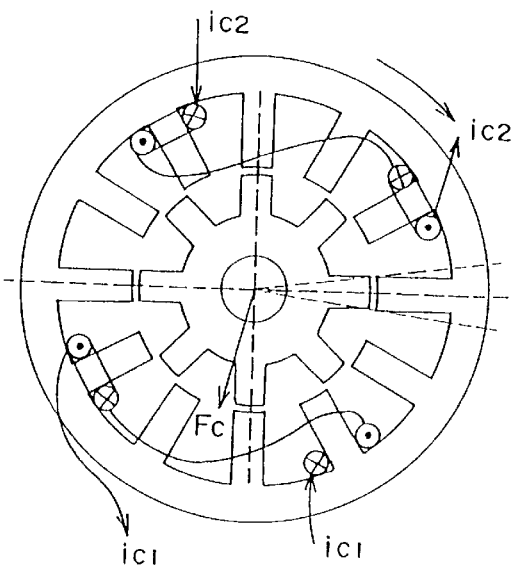
FIG. 6
FIG. 7

FIG. 8
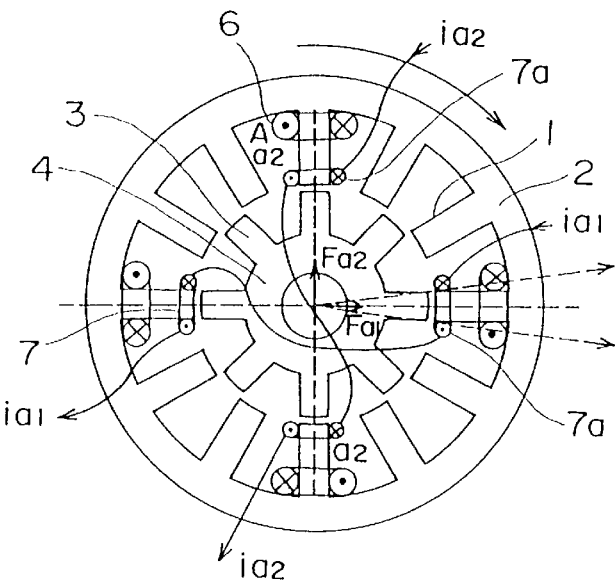
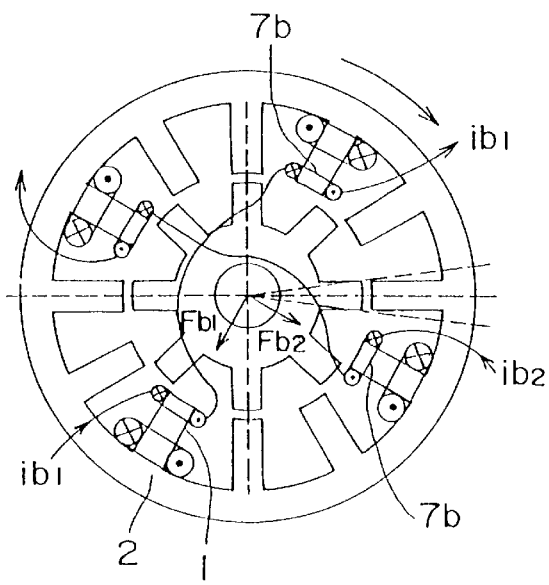
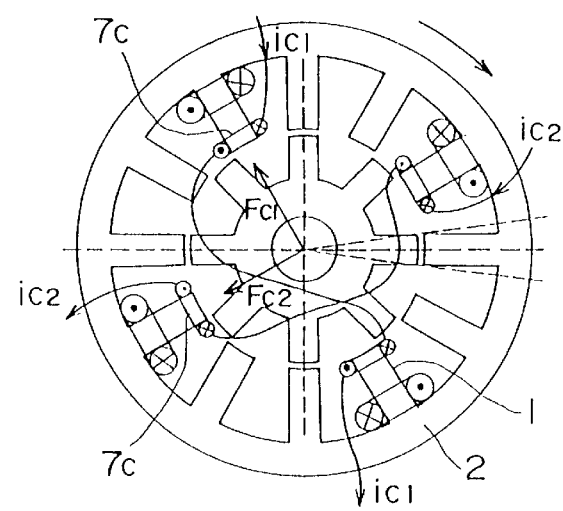
FIG. 9          FIG. 10

System 1

System 2

System 3

FIG. 23
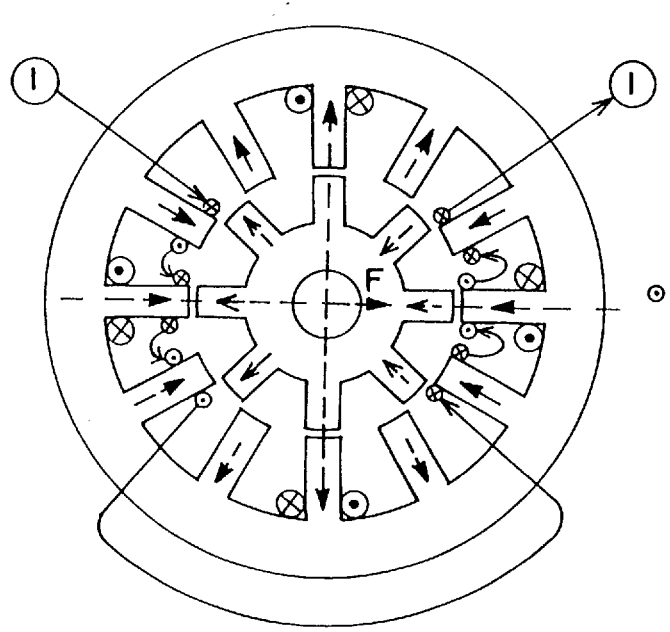
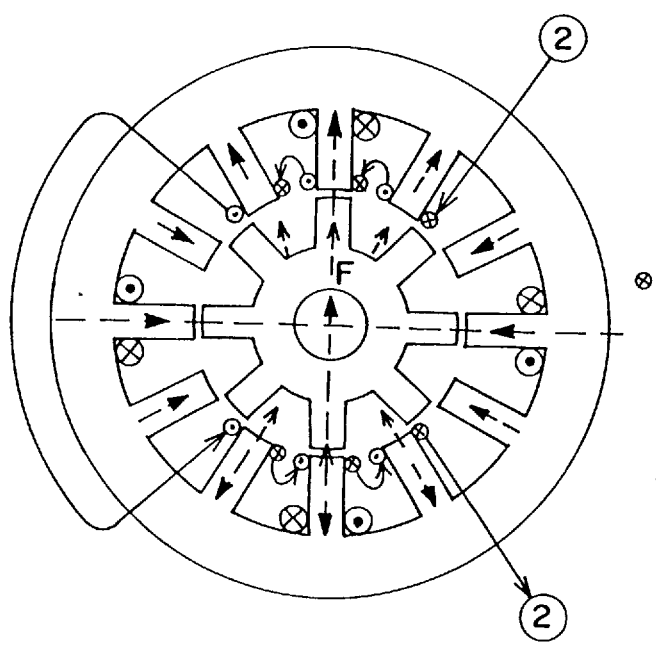
FIG. 24

FIG. 26
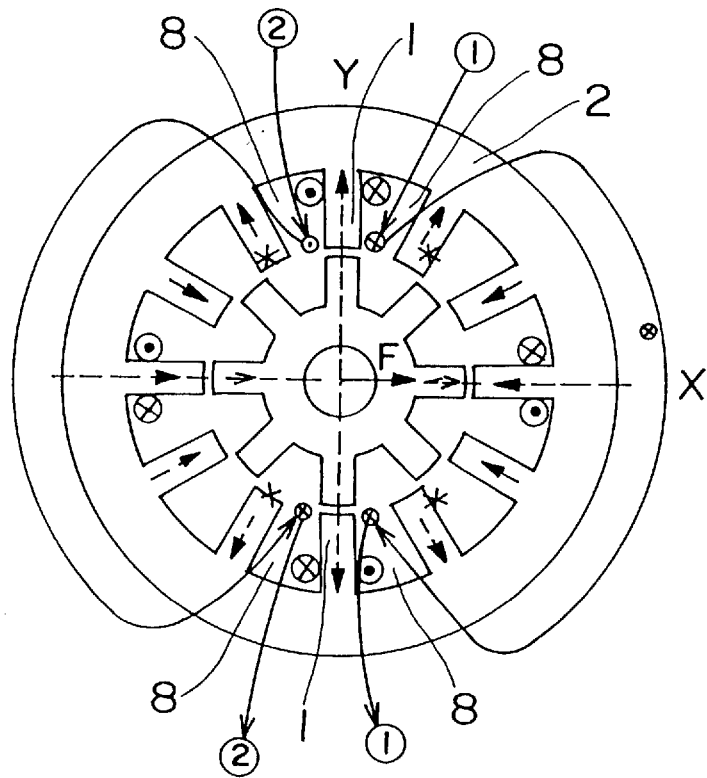
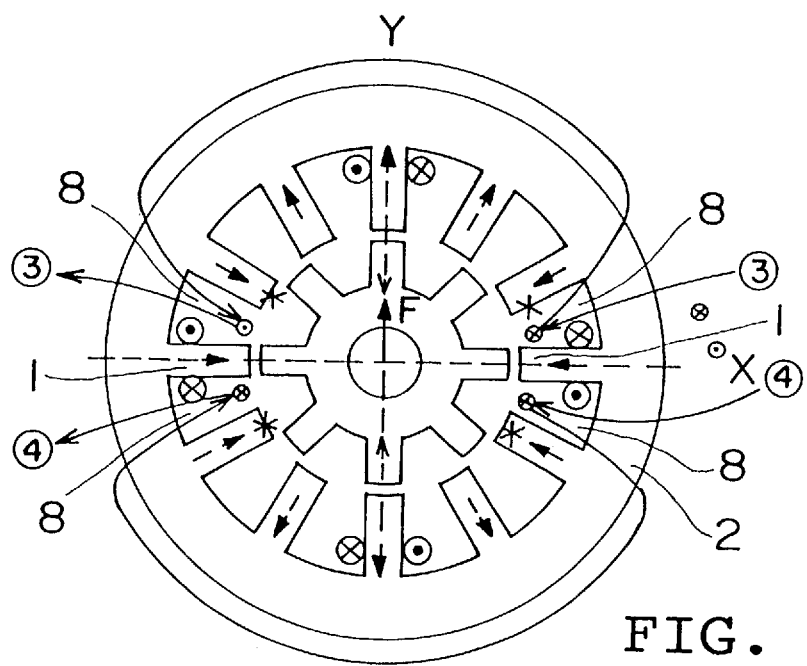
FIG. 27

SWITCHED RELUCTANCE ROTATOR

INDUSTRIAL FIELD

This invention relates to a switched reluctance rotator. More particularly, it relates to a switched reluctance rotator capable of rotating a rotor at a high speed without generating electromagnetic vibration at the rotating shaft of the rotor.

PRIOR ART

A switched reluctance rotator includes a switched reluctance motor and a switched reluctance generator.

A conventional switched reluctance motor is shown in FIG. 32.

As shown in FIG. 32, switched reluctance motor 50 comprises a four pole rotor 51 wherein each of the poles protrudes crosswisely around the rotating shaft and a six pole stator 52 arranged around the rotor 51, each of the protruding pole of said stator 52 having a concentrated winding 53 which is concentratedly wound. The current passed through winding 53 (referred to as a winding current) is unidirectional and includes a distorted wave current and direct current component. In FIG. 32, 54 indicates an invertor and 55 indicates a direct current source.

In the switched reluctance motor 50 having the above construction, the protruding poles of stator 52 attract the protruding poles on the outer peripheral surface of rotor 51 to generate a torque and as a result, rotor 51 rotates. In the switched reluctance motor 50 having the above construction, if the rotor 51 is eccentric or machined incorrectly a great force in the radial direction is generated, which generates an electromagnetic vibration. Furthermore, when the length of gap between the rotor 51 and the stator 52 is extremely reduced for improving the efficiency of said rotator, another problem occurs that more electromagnetic vibration and more noise are generated compared with a usual motor.

The same problems are also seen in switched reluctance generators.

An object of this invention is to solve the above problems. Another object of this invention is to provide a switched reluctance rotator according to which even if deviation of the rotating shaft occurs when the rotor is rotating, the deviation is automatically corrected to prevent from the generation of electromagnetic vibration and simultaneously the rotor is supported in a levitating manner by a magnetic force, and thus, the rotating shaft rotates smoothly.

DISCLOSURE OF INVENTION

This invention relates to a switched reluctance rotator, characterized by having a rotor provided with a plurality of protruding poles, a stator arranged around the rotor and provided with protruding poles, windings provided at the respective protruding poles of the stator, and a current controlling part which controls the current passed through the windings so as to generate a torque and a radial force at the rotor.

In the above switched reluctance rotator, the windings are independently on the respective protruding poles so that said windings can be independently energized, and said current controlling device is formed so that the current passed through the respective windings can be independently controlled so as to generate a radial force.

In the above switched reluctance rotator, the windings comprise a plurality of groups of windings through which current can be independently passed and said current controlling device is formed so that the current passed through said winding groups can be independently controlled so as to generate a radial force.

Another invention relates to a switched reluctance rotator having a rotor provided with a plurality of protruding poles, a stator arranged around the rotor and provided with protruding poles, and windings for generating a torque provided at the respective protruding poles of the stator and generating a rotating torque at the rotor, characterized in that the windings for generating radial force which give a radial force to the rotor are provided at the respective protruding poles of the rotor so as to magnetically levitate the rotor.

This switched reluctance rotator desirably has a deviation detector which detects the deviation of the rotor in the radial direction and a current controlling part which inputs therein the detection signal which is the output from the deviation detector and outputs a controlled current to the windings for generating a radial force.

BRIEF DESCRIPTION OF THE DRAWINGS

FIGS. 5–7 are diagrams explaining the second method for generating a radial force at the rotor in a switched reluctance rotator of this invention.

FIGS. 8–10 are diagrams explaining the third method for generating a radial force at the rotor in a switched reluctance rotator of this invention.

FIGS. 23–24 are diagrams explaining another example of the fifth method for generating a radial force at the rotor in a switched reluctance rotator of this invention.

FIGS. 26–27 are diagrams explaining another example of the seventh method for generating a radial force at the rotor in a switched reluctance rotator of this invention.

BEST MODE FOR CARRYING OUT THE INVENTION

The switched reluctance rotator of this invention has a rotor provided with a plurality of protruding poles, a stator arranged around the rotor and provided with a plurality of protruding poles facing the rotor, and windings wound on the protruding poles of the stator. The number of the protruding poles provided on the rotor differs from that of the protruding poles provided on the stator. If the protruding poles of the stator and the rotor are formed so that not all of the protruding poles of the stator face to the protruding poles of the rotor when the rotor is standing still, there is no limitation both in the number of the protruding poles of the stator and the number of the protruding poles of the rotor.

In general, the number of the protruding poles of the stator is even. With increase in the number of the protruding poles of the stator and the rotor, the rotor rotates more smoothly.

Figure 1:
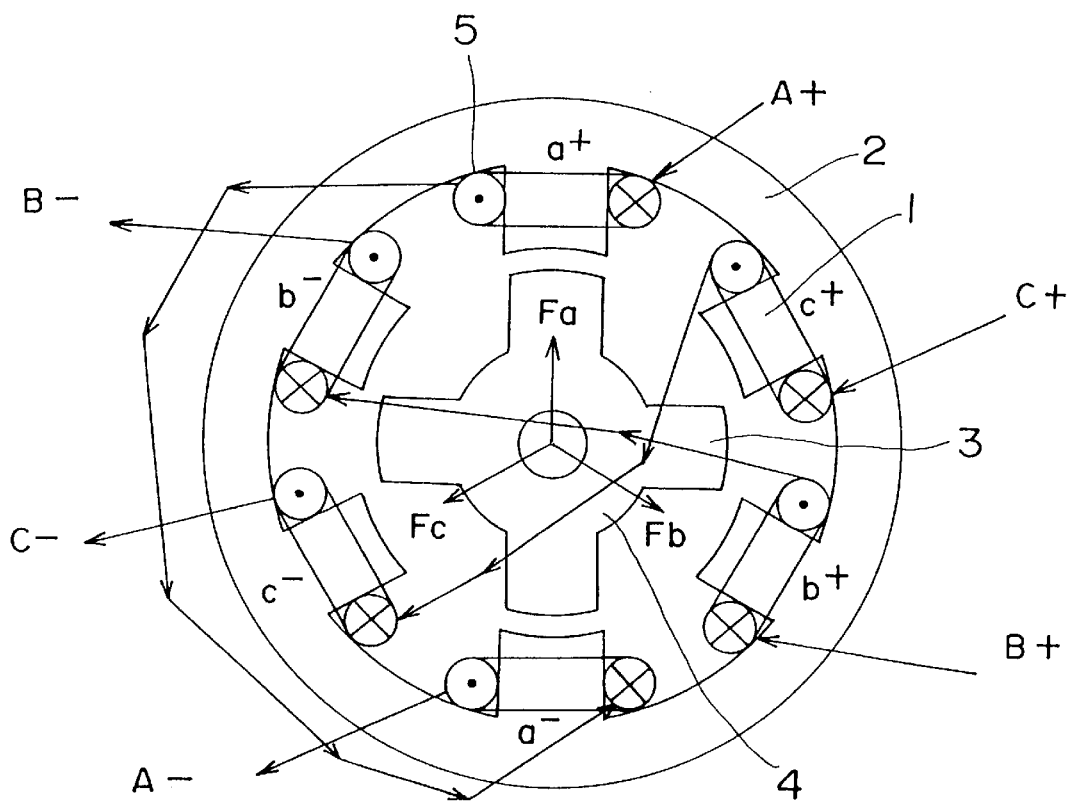
FIG. 1 is a diagram explaining the principle of generating a torque at the rotor in a switched reluctance rotator of this invention.

The rotor of this switched reluctance rotator generates a torque after the following principle. To explain the above principle, the switched reluctance rotator shown in FIG. 1 is taken as an example. The switched reluctance rotator has a stator 2 with six protruding poles 1 and a rotor 4 with four protruding poles 3. Each of protruding poles 1 on stator 2 is wound with winding 5, and the windings 5 on the two protruding poles 1 opposite to each other are electrically connected. Thus, three pairs of opposite two poles of phase A, phase B, and phase C are formed. When a current is passed from $B_+$ to $B_-$, protruding poles 1 of phase B are magnetized and attract protruding poles 3 of the rotor to generate a clockwise torque.

Accordingly, a torque is generated at the rotor by successively energizing the adjacent winding according to the position of protruding pole 3 of the rotor. In FIG. 1 and others, "●" and "X" ○ in denoting the winding indicate the direction of passing current, and "●" indicates the direction of the current piercing through the paper from the reverse side to the face of the paper and "X" indicates the direction of the current piercing, through the paper from the face thereof to the reverse side., When the rotor is rotated at a low speed, it is preferred to pass a current having a rectangular wave form of nearly constant current peak value through the, windings, and, furthermore, when load applied to the rotor is small, preferably the period of passing the above rectangular wave current is shortened or the height of the above current wave is lowered.

In the switched reluctance rotator of this invention, deviation of the rotor can be avoided and the rotor can be magnetically levitated by applying a radial force to the rotor according to the deviation data output from a means which detects the deviation of the rotor from the rotation center.

In this invention, two methods are employed for generating a radial force at the rotor.

The first method comprises passing a current for generating a torque through each of the windings on the protruding pole of the stator and passing a controlled current through the windings so as to generate a radial force at the rotor. This first method is advantageous in that a large invertor is not specifically needed for generating a torque at the rotating shaft of the switched reluctance rotator since a strong radial force can be generated by this method. Therefore, a switched reluctance rotator employing this method is suitable in case when not a large torque generated at the rotating shaft but a large radial force is needed.

The first method further includes several systems.

Figure 2:
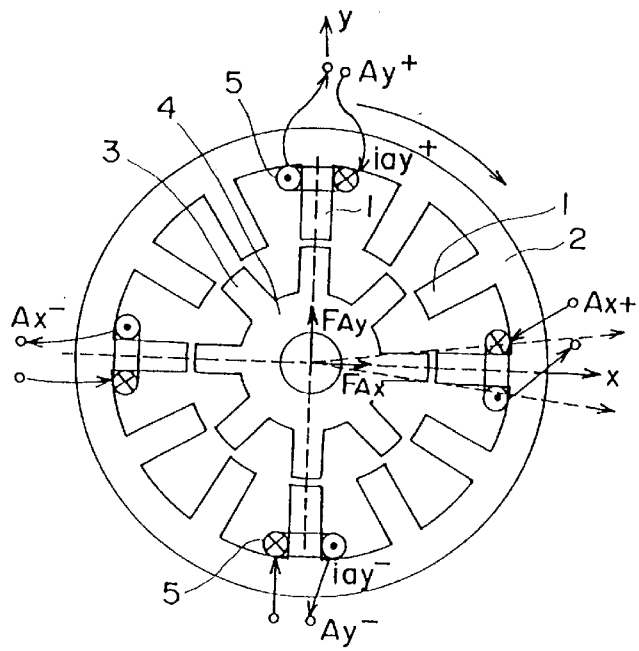
FIGS. 2–4 are diagrams explaining the first method for generating a radial force at the rotor in a switched reluctance rotator of this invention.

One example of the first system is such that twelve protruding poles are provided on the stator and each of the protruding poles has a winding, and, on the other hand, eight protruding poles are provided on the rotor, wherein the currents passed through the windings are independently controlled so as to generate a radial force. As shown in FIG. 2, for generating Y-direction force $F_{AY}$, the current passed through the $A_y^+$ winding 5 on the protruding pole 1 of the stator 2 is increased and the current passed through the $A_y^-$ winding 5 on the protruding pole 1 opposite to the protruding pole 1 wound with the $A_y^+$ winding 5 is decreased, An X-direction force $F_{AX}$ also can be similarly generated.

Figure 3:
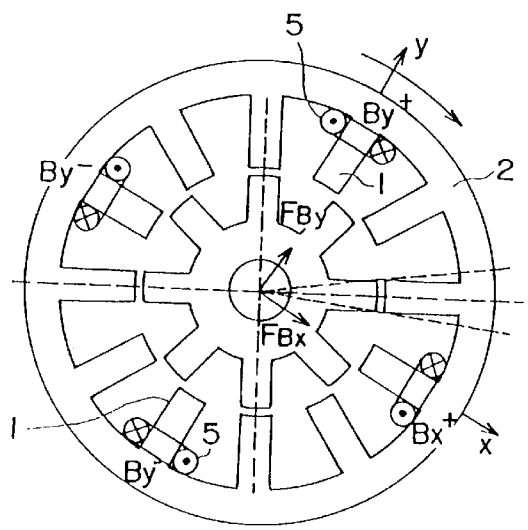
Figure 4:
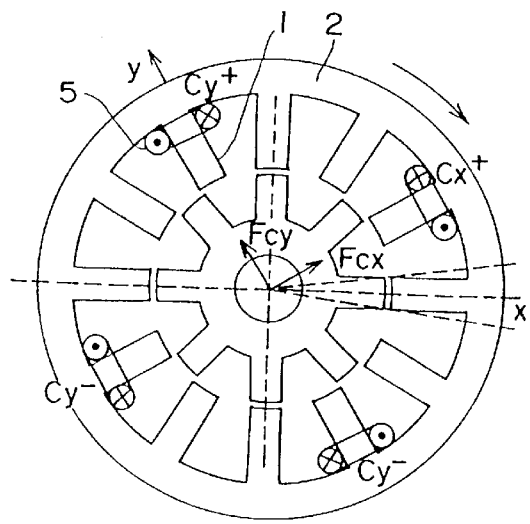

Similarly, as shown in FIG. 3 and FIG. 4, for generating Y-direction force $F_{BY}$, the current passed through the $B_y^+$ winding 5 on the protruding pole 1 of the stator 2 is increased and the current passed through the $B_y^-$ winding 5 on the protruding pole 1 opposite to the protruding pole 1 wound with the $B_y^+$ winding 5 is decreased. For generating Y-direction force $F_{CY}$, the current passed through the $C_y^+$ winding 5 on the protruding pole 1 of the stator 2 is increased and the current passed through the $C_y^-$ winding 5 on the protruding pole 1 opposite to the protruding pole 1 wound with the $C_y^+$ winding 5 is decreased.

As a result, a radial force of any direction can be generated by combining the above three radial forces according to the magnetic flux number generated at each of the protruding poles 1 of the stator 2. The first system requires twenty-four wirings for the windings on the twelve protruding poles, and a controller for independently controlling the current passed through the twelve windings such as a 12-phase invertor is necessary.

In short, in the first system, radial forces can be generated in any direction by passing the current independently through the winding wires on an arbitrary number of protruding poles provided on the stator and controlling the quantity of the passing current.

As shown in FIG. 5, an example of the second system is such that twelve protruding poles 1 are provided at the stator 2 and each of the protruding poles 1 is wound with winding 5, further, eight protruding poles 3 are provided at the rotor 4, wherein currents of different current value are passed through windings 5 on two protruding poles 1 one of which is in the direction perpendicular to the direction of another and windings. 5 on the two protruding poles 1 opposite to the above two protruding poles 1.

In FIG. 5, when current $i_{a1}$ is passed through windings 5 on protruding pole 1a and protruding pole 1b arranged in the direction perpendicular to the protruding pole 1a, and current $i_{a2}$ ($i_{a1} > i_{a2}$) is passed through windings on the protruding pole 1c and the protruding pole 1d arranged in the direction perpendicular to the protruding pole 1c, flux density of the protruding poles 1a and 1b increases and the radial force $F_a$ is generated. On the other hand, in the case of $i_{a1} < i_{a2}$, the radial force $F_a$ in the direction opposite to the above $F_a$ is generated. Similarly, as shown in FIG. 6, a radial force Fb is generated by passing current $i_{b1}$ and current $i_{b2}$ ($i_{b1} > i_{b2}$), and, as shown in FIG. 7, a radial force $F_c$ is generated by passing current $i_{c1}$ and current $i_{c2}$ ($i_{c1} > i_{c2}$) Radial force of desired direction and strength is generated by combining the forces of these three directions.

In the above second system, for example, magnetic fluxes of six phases are formed by the windings on twelve protruding poles and a six-phase invertor is needed.

As mentioned above, the first method for generating a radial force at the rotor is a system of passing a current controlled to generate a radial force through the winding which generates a torque, and, accordingly, the winding for generating torque and the winding for generating radial force-.-are the same.

On the other hand, the second method for generating a radial force at the rotor in this invention is to provide, in addition to a winding for generating torque at the protruding poles of the stator (sometimes referred to as "torque generating winding"), another winding for generating radial force (sometimes referred to as "differential winding" or "radial force generating winding"). The switched reluctance rotator which employs the second method in which the magnetic flux generated by the torque generating winding and the magnetic flux generated by the differential winding are imbalanced by applying the differential winding is suitable for bearing-less rotator's which are mainly intended to generate torque.

This second method can :further be classified into several systems.

In the third system (since the systems included in the first method are called the first system and the second system, consecutive numbers will be employed hereinafter), as shown in FIG. 8 to FIG. 10, in the switched reluctance rotator in which twelve protruding poles 1 are provided at the stator 2 and each of protruding poles 1 is wound with torque generating winding 6 and eight protruding poles 3 are provided at the rotor 4, the winding on one protruding pole 1 of the stator 2 is connected in series with the winding on another protruding pole opposite to the above protruding pole, thereby to form six pairs of radial force generating windings 7a.

As shown in FIG. 8, when current $i_{a1}$ is passed through the radial force generating windings 7a on protruding poles 1 opposing each other, a radial force is generated in the direction of from left to right in FIG. 8, and when current $i_{a1}$ is passed in the opposite direction, a radial force is generated in the direction of from right to left. Similarly, when current $i_{a2}$ is passed through the radial force generating winding 7a which is perpendicular to the above radial force generating winding 7a, a radial force is generated in the direction of from the downside to the upside in FIG. 8, and when current $i_{a2}$ is passed in the opposite direction, a radial force is generated in the direction of from the upside to the downside. Similarly, as shown in FIG. 9 and FIG. 10, when current is passed through radial force generating winding 7b of phase b and radial force generating winding 7c of phase c, the radial forces of $F_{b1}$, $F_{b2}$, $F_{c1}$ and $F_{c2}$ are generated. Therefore, since six radial forces are generated by passing current through the six pairs of radial force generating windings 7a, 7b and 7c, radial forces of any directions can be formed by controlling the value of current passed through each of the radial force generating windings 7a, 7b and 7c.

Figure 11:
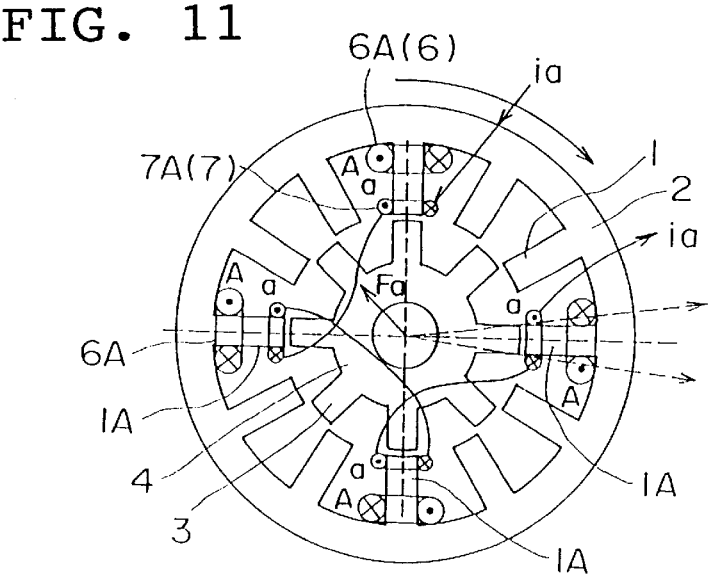
FIGS. 11–13 are diagrams explaining the fourth method for generating a radial force at the rotor in a switched reluctance rotator of this invention.
Figure 12:
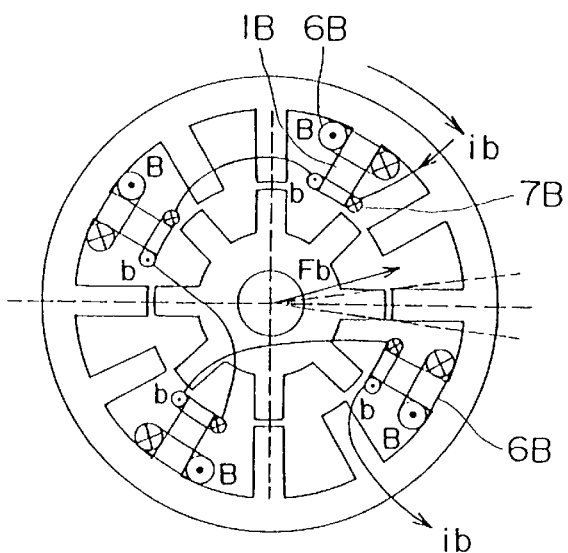
Figure 13:
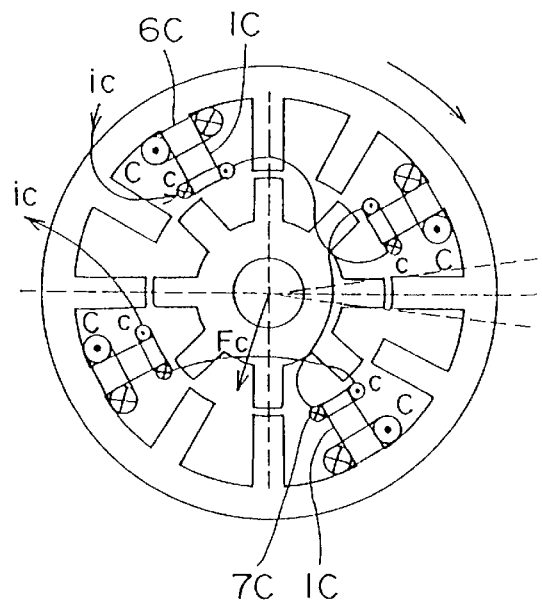

In the fourth system, as shown in FIGS. 11–13, for example, twelve protruding poles 1 are provided at stator 2 and the twelve protruding poles 1 are divided into three groups of phase A, phase B and phase C, each of which comprises protruding poles 1 positioned perpendicular to each other, each of the twelve protruding poles 1 is wound with torque generating winding 6 and radial force generating winding 7, and torque generating windings 6A on protruding poles 1A of phase A are connected in series with each other, and, similarly, torque generating windings 6B on protruding poles 1B of phase B and torque generating windings 6C wound on protruding poles 1C of phase C are also connected in series with each other, respectively. With regard to the radial force generating winding on each of four protruding poles constituting the protruding poles 1A of phase A, as shown in FIG. 11, two radial force generating windings 7A which are in the positions perpendicular to each other are wound so that the current flows in the same direction as the direction of the current in the torque generating winding 6A on the protruding pole 1A, and two radial force generating windings 7A opposite to the above-mentioned two radial force generating windings 7A are wound so that the current flows in the direction opposite to the direction of the current in the torque generating winding 6A on the protruding pole 1A, and, besides, four radial force generating windings 7A are connected in series so that the direction of the current is as mentioned in the above. Because the radial-force or differential windings are wound in the same sense of rotation their magnetic fields are aligned instead of opposite.

As shown in FIG. 11, when current $i_a$ is flowed into radial force generating windings 7A, the magnetic flux density increases at a protruding pole 1A and decreases at another protruding pole 1A. As a result, a radial force in the direction of Fa is generated.

As shown in FIG. 12, similarly, a radial force in the direction of Fb is generated by flowing current $i_b$ into radial force generating windings 7B, and, as shown in FIG. 13, similarly, a radial force in the direction of Fc is generated by flowing current $i_c$ into the radial force generating windings 7C. Therefore, by controlling the currents $i_a$, $i_b$ and $i_c$, radial forces of any directions can be generated as a combination of the radial forces of three directions.

As mentioned above, in the first system to the fourth system, a radial force of a given direction is generated as a combination of radial forces of three or six directions. Since if radial forces of at least two directions can be generated, a desired amount radial force can be generated, it appears simple to generate a radial force of three directions or six directions.

Actually, the pole which is excited by the torque generating winding for generating torque is changed.

Figure 14:
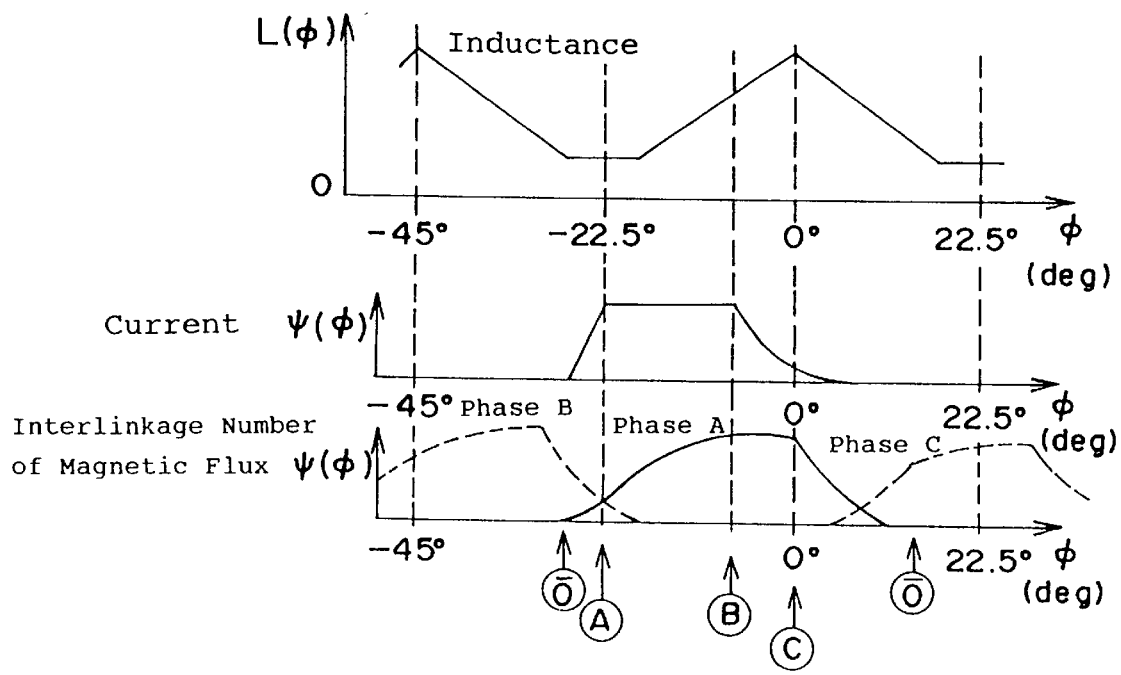
FIG. 14 is a graph which shows the relations between rotating angle and inductance, current and interlinkage number of magnetic fluxes in the windings for generating a radial force which are wound on the protruding poles of the stator in a switched reluctance rotator of this invention.

For example, FIG. 14 shows the relations between the rotating angle of the rotor and the increase or decrease of inductance, the current supplied to the torque generating winding (i.e., motor driving current) and the interlinkage number of magnetic flux in the phase A. FIG. 14 shows the relation between the interlinkage number of magnetic flux and the current. As shown in FIG. 14, a current is passed through the torque generating winding at about the rising of inductance to generate a torque of the rotor.

Figure 15:
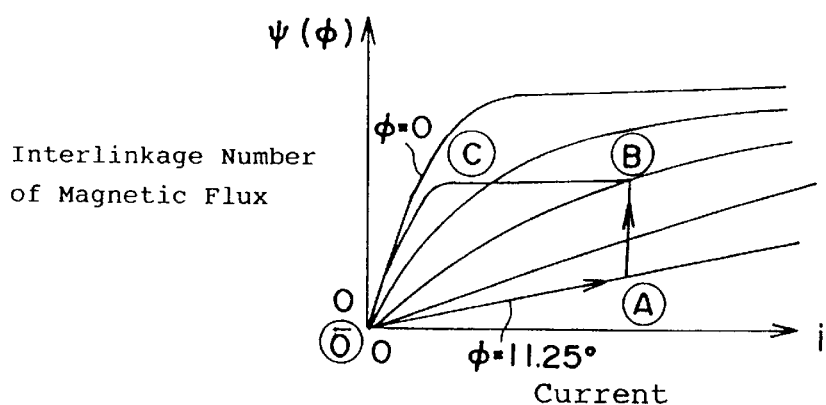
FIG. 15 is a graph which shows the relation between the current passed through the windings for generating a radial force and the interlinkage number of magnetic fluxes.

As shown in FIG. 14, it is clear that (1) the section where current flows is limited, (2) the section where the interlinkage number of magnetic flux is large and the gap magnetic flux is high is further limited (limited to the section from the intermediate point between the point A and the point B to the point C), and that (3) there exists a section where all the magnetic flux interlinkage numbers from phase A to phase C are small FIG. 15 shows the relation between the current passed through the radial force generating winding and the interlinkage number of magnetic flux.

Figure 16:
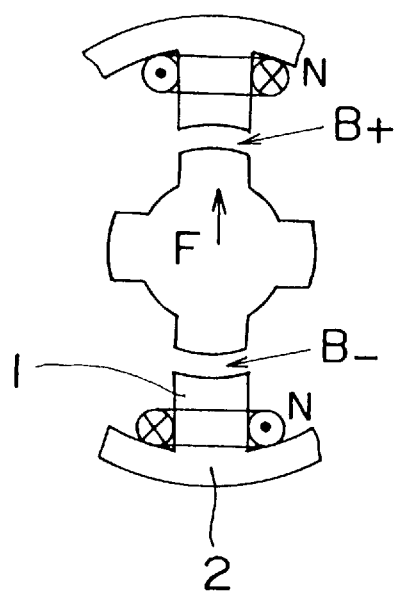
FIG. 16 is a diagram explaining that the radial force is proportional to the difference between the square of magnetic flux densities $B_+$ and $B_-$ of poles opposite to each other.

As shown in FIG. 16, the radial force is in proportion to the difference between the square of magnetic flux density $B_+$ and the square of magnetic flux density B of the poles opposite to each otter. Therefore, when the interlinkage number of magnetic flux is large, a large radial force can be generated by passing a small current through the radial force generating winding. Thus, by imbalancing the magnetic flux density of the poles in the section of the larger interlinkage number of magnetic flux, a radial force can be efficiently generated.

Therefore, sections of phase A to phase C having a large interlinkage number of magnetic flux C should be as wide as possible.

It is desired that among these three phases, the magnetic flux interlinkage number is always kept large in one phase in the first and the third systems and in two phases in the second and the fourth systems.

On the other hand, the radial force F is shown by the following formula (1) in the model shown in FIG. 16.

$$F = (S/2\mu_0) \cdot (B_+^2 - B_-^2) \tag{1}$$

In the above formula (1), S indicates an area at the gap between the protruding pole of the rotor and that of the stator, $\mu_0$ is $4\pi \times 10^{-7}$ H/mr and $B_+$ and $B_-$ indicate magnetic flux density. In FIG. 16, N indicates the winding number of the winding.

When in FIG. 16, the magnetic flux interlinkage number of the upper winding is indicated by $\overline{\Psi}_+$, the magnetic flux interlinkage number of the lower winding is indicated by $\overline{\Psi}_-$, and the winding number is indicated by N, the magnetic flux density $B_+$ and $B_-$ are $B_+ = \overline{\Psi}_+(NS)$ and $B_- = \overline{\Psi}_{31}/(NS)$, respectively. Therefore, the above formula (1) can be rewritten to the formula (2) by substitution.

$$F = (2\mu_0 \cdot N^2 \cdot S)^{-1} \cdot (\overline{\Psi}_+^2 - \overline{\Psi}_-^2) \tag{2}$$

For simplification, assuming to be magnetically linear, given that L is the induc Lance and $i_+$ and $i_-$ are the currents passing through the windings, $\Psi^-{}_+$ and $\Psi^-{}_-$ are given as follows: $\overline{\Psi}_+ = L \cdot i_+$ and $\overline{\Psi}_- = L \cdot i_-$, and therefore, the above formula (2) is rewritten to the formula (3).

$$F = L^2 \cdot (2\mu_0 \cdot N^2 \cdot S)^{-1} \cdot (i_+^2 - i_-^2) \tag{3}$$

Furthermore, linearized at around the working point and given that $i_+ = i_0 + i$ and $i_- = i_0 - i$ ($i << i_0$), $i_+$, $i_-$, $i_0$ and i are in the following relation: $i_+^2 - i_-^2 = (i_0+i)^2 - (i_0-i)^2 = 4 i_0 \cdot i$.

By substituting the above for $i_+^2 - i_-^2$ in the formula (3), the following formula (4) is given.

$$\begin{aligned} F &= L^2 \cdot (2\mu_0 \cdot N^2 \cdot S)^{-1} \cdot 4 i_0 \cdot i \\ &= (2L^2 \cdot i_0 \cdot i)(\mu_0 \cdot N^2 \cdot S)^{-1} \end{aligned} \tag{4}$$

The above formula (4) clearly shows that the radial force F is in proportion to the micro-current i.

Figure 17:
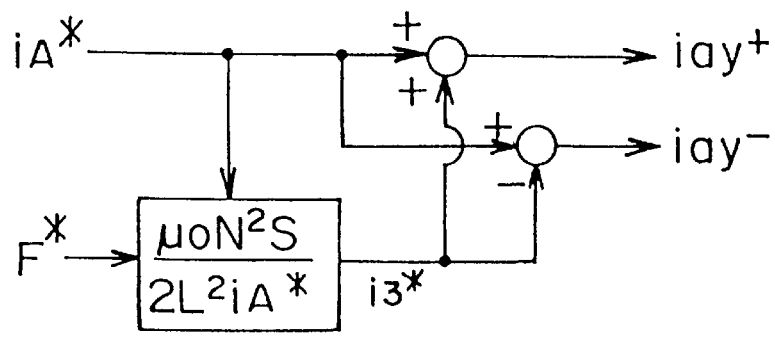
FIG. 17 is a block diagram showing three systems for determining the quantity of current passed through the windings for generating a radial force.
Figure 17:
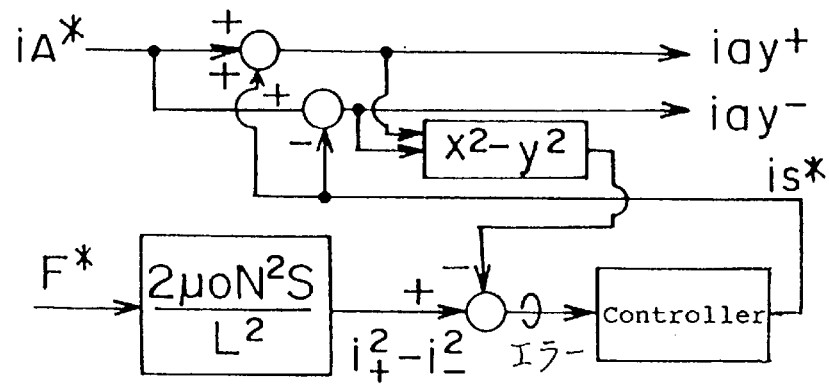
Figure 17:
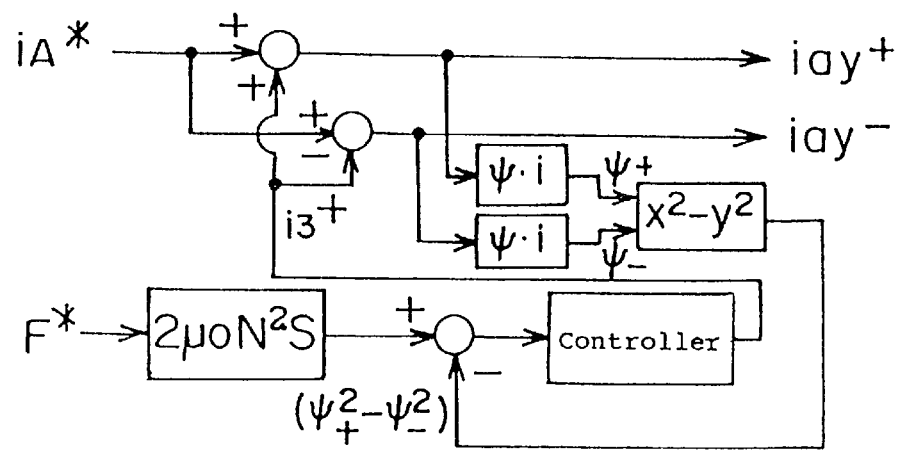

Therefore, for example in the first system, regarding the direction Y of phase A, the current can be determined by the system 1 shown in FIG. 17.

In FIG. 17, $i_A^*$ is a current instruction value for generating a torque at the rotor and $F^*$ is a current instruction value for generating radial force. Giving $F^*$ as F, the above formula (4) is solved on i to obtain the result of $i_S^*$, which is added to $i_A^*$ to obtain $i_{aY}^+$. Then, $i_S^*$ is subtracted from $i_A^*$ to obtain $i_{aY}^-$. Current $i_{aY}^+$ is passed through $A_y^+$ winding shown in FIG. 2 and current $i_{aY}^-$ is passed through $A_y^-$ winding.

In case when $F^*$ does not change, $i_A^*$ decreases and $i_S^*$ increases when the magnetic flux interlinkage number of phase A is small.

When the dynamic range of radial force is wide, the above formula (4) cannot be used and, hence, the formula (3) is used. In this case, $i_+^2 - i_-^2$ can be controlled by employing the system 2 in FIG. 17.

Figure 18:
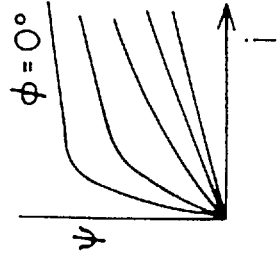
FIG. 18 is a diagram showing an estimation circuit which estimates the interlinkage number of magnetic flux $\overline{\Psi}$ from the current i.
Figure 19:
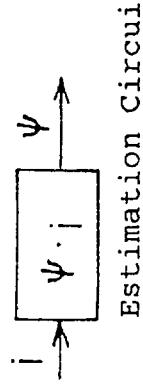
FIG. 19 is a graph showing the relation between the current value passed through the windings for generating a radial force and the magnetic flux interlinkage number.

In case the non-linearity of an iron core must be taken into consideration, the system 3 in FIG. 17 is employed. Giving $F^*$ as F, the formula (2) is solved for $(\overline{\Psi}_+^2 - \overline{\Psi}_-^2)$ to calculate $(\overline{\Psi}_+^2 - \overline{\Psi}_-^2)^*$. $(\overline{\Psi}_+^2 - \overline{\Psi}_-^2)$ is calculated from $\overline{\Psi}_+$ estimated as shown in system 3 shown in FIG. 17 and compared with $(\overline{\Psi}_+^2 - \overline{\Psi}_-^2)^*$ to cause unequilibrium of currents. In this case, $(\overline{\Psi}_+^2 - \overline{\Psi}_-^2)$ may be a detected value. The estimation circuit shown in FIG. 17 and FIG. 18 which estimates the magnetic flux interlinkage number $\overline{\Psi}$ from a current value includes therein nonlinear functions between the magnetic flux interlinkage number $\overline{\Psi}$ and the rotating angle and the current, and the magnetic flux interlinkage number $\overline{\Psi}$ can be calculated from the current value i according to the detected rotating angle.

In the third system in which a difference winding (namely, radial force generating winding) is provided, the systems 1–3 shown in FIG. 17 are dealt with in the following manner.

In the system 1 in FIG. 17, $i_A^*$ is the differential winding current. In the system 2 in FIG. 17, when the differential winding current is indicated by $i_S$, there is obtained the relation $i_+^2 - i_-^2 = (i_A^2 + i_S^2) - (i_A^2 - i_S^2) = 2i_A^2 + 4 i_A \cdot i_S + 2 i_S^2$. From this relation, $2 i_A^2 + 4 i_A \cdot i_S + 2 i_S^2 - (i_+^2 - i_-^2) = 0$ is obtained.

This formula may be solved to obtain is from $(i_+^2 - i_-^2)$. Therefore, the calculation of $i_{ay}^{+2} - i_{ay}^{-2}$ may be omitted.

On the other hand, $i_{ay}^+$ and $i_{ay}^-$ may be detected with the output of controller of $i_S$ and without changing the form of the controller in the system 2.

In the system 3 in FIG. 17, the output of controller is preferably $i_S$. In the calculation of $\overline{\Psi}_+$ and $\overline{\Psi}_-$, $i_A^*$ may be a detected value and $i_S^*$ may also be a detected value.

In the second system, $i_{aY}^+$ and $i_{aY}^-$ correspond to $i_{a1}$ and $i_{a2}$ in the systems 1–3 in FIG. 17, respectively.

The fourth system is similar to the third system.

In the systems 1–3, when $i_A^*$ is 0 or small, i, $i_S^*$, $i_A^*$ increase, respectively. $i_S$ and i are restricted to around $i_A^* > (i_S^*$ or i). That is, it occurs that $i_S^*$ or i is close to $i_A^*$ when $F^*$ is larger than the radial force which can be generated at the pole or phase. In this case, the magnetic flux level must be increased by transmitting a signal to the controller of the rotator.

In order to avoid such condition, the data on the position in radial direction are input into the radial direction position controller 10 from a detector (deviation detector) which detects the position of rotating shaft in X direction and Y direction, this radial position controller 10 determines radial force instruction values $F\alpha^*$ and $F\beta^*$, and these radial force instruction values $F\alpha^*$ and $F\beta^*$ are output to the radial force vector distributor 11, where the desired radial force is resolved into vectors.

While resolving the radial force into vectors which can be generated, the magnetic flux level of each phase should be necessarily checked.

When the magnetic flux level is insufficient, demand for increasing of magnetic flux level is sent to rotator controller 12. The rotator controller 12 receiving the demand generates and outputs current instruction values $i_A^*$, $i_B^*$ and $i_C^*$ which increase the magnetic flux level without changing torque portion. The current instruction values $i_A{}^*$, $i_B{}^*$ and $i_C{}^*$ and the radial forces $F_a{}^*$, $F_b{}^*$ and $F_c{}^*$ of three directions output from the radial force vector distributor 11 are output to the radial force controller 13 containing either one of the systems 1–3 shown in FIG. 17, and current instruction values $i_{ay}{}^+$ and $i_{ay}{}^-$ passed through the radial force generating winding of, for example, $Y^+$ direction and $Y^-$ direction are output from the radial force controller 13. In this way, necessary radial forces can be generated.

Figure 20:
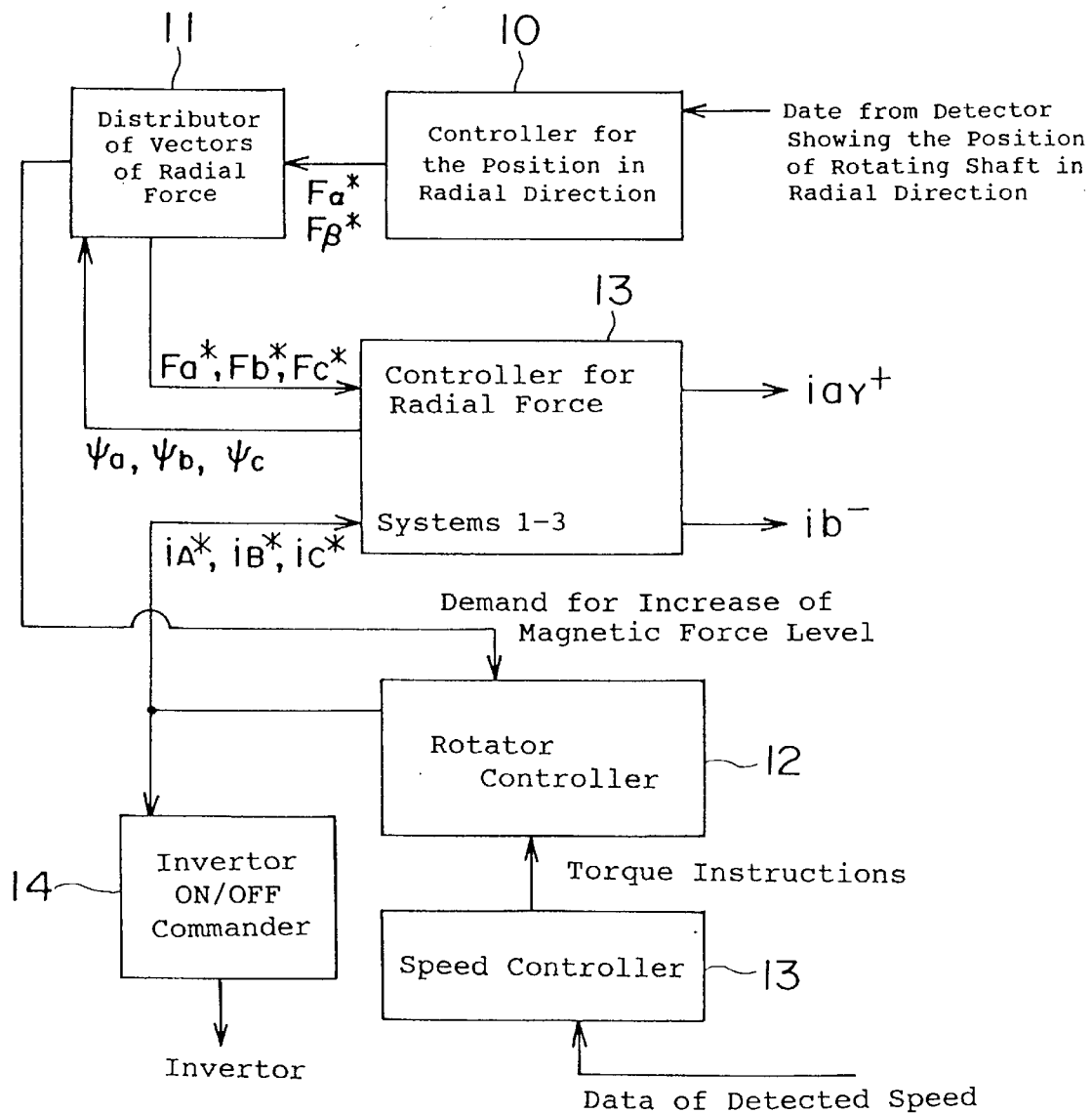
FIG. 20 is a block diagram showing a method for determining the current instruction value necessary for generating a radial force from a data which show the position of the rotating shaft in a radial direction.

In FIG. 20, speed controller 15 inputs therein the detected speed data output from the speed detector which. detects the rotation speed of the rotor and determines the torque for rotating said rotor in a given rotation speed and outputs torque instruction value. Furthermore, invertor ON/OFF commander 14 inputs therein the current instruction values $i_A{}^*$, $i_B{}^*$ and $i_C{}^*$ output from the rotator controller 12 and send a signal to instructing ON/OFF switching to the invertor.

The above-mentioned systems can be simplified. That is, MMF or magnetic flux by which the current which is passed through the radial force generating winding can be generated is previously calculated, and current instructions can be generated at the rotator so that the magnetic flux level is not smaller than the calculated magnetic flux. When the radial force to generate may be small, this method is effective. According to this method, the demand for increase of magnetic level is not necessary. This method is equivalent previously to controlling the rotator so that the magnetic level does not increase.

In the fifth system of the second method, all the protruding poles of the stator are grouped into four groups, and the protruding poles belonging to one of the four groups and the protruding poles belonging to another group in the position opposite to the above protruding poles are wound in a concentrated manner.

Figure 21:
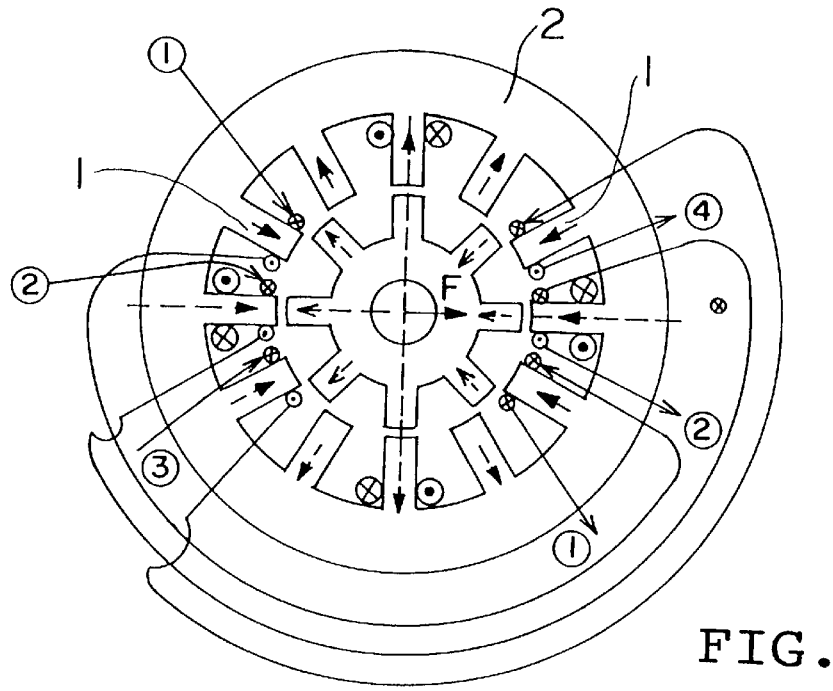
FIGS. 21–22 are diagrams explaining the fifth method for generating a radial force at the rotor in a switched reluctance rotator of this invention.
Figure 22:
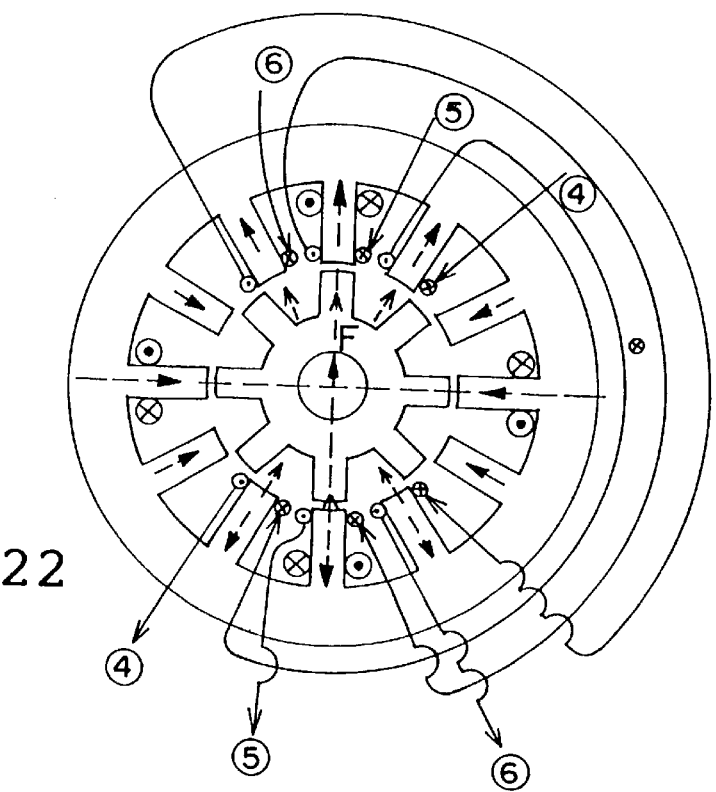

For example, as shown in FIG. 21 and FIG. 22, twelve protruding poles 1 formed at the stator 2 are grouped into four groups, each of which contains adjacent three protruding poles 1, and given three protruding poles 1 and three protruding poles 1 opposite to the above three protruding poles 1 are wound in concentrated manner with windings. In FIG. 21 and FIG. 22, the protruding poles 1 opposite to each other are wound in a concentrated manner with windings. By the concentrated winding shown in FIG. 21 and FIG. 22, six radial force generating windings 1–6 are formed and twelve wirings are needed. Independently controlled current is passed through each of the radial force generating windings ①–⑥. The direction of the passed current is the same as the direction of the winding in FIG. 21 and FIG. 22. By controlling the current value passed through each of the radial force generating windings ①–⑥, a radial force in a desired direction is generated as a vectorial sum of the radial forces generated by the radial force generating windings ①–⑥. Since concentrated windings are used as the above radial force generating windings, a radial force can be generated accurately and efficiently by calculating the radial direction vector in accordance with a momentary value of the current passing through each of the radial force generating windings ①–⑥.

The method for the concentrated winding is as follows: as shown in FIG. 23 and FIG. 24, the windings on the adjacent three protruding poles are connected in series with each other to form two radial force generating windings ① and ②. By independently controlling the current passed through the two radial force generating windings ① and ②, there is generated a radial force as a vectorial sum of the radial forces generated by the respective windings. This concentrated winding has the advantage that four wiring suffice to generate the radial force F.

Figure 25:
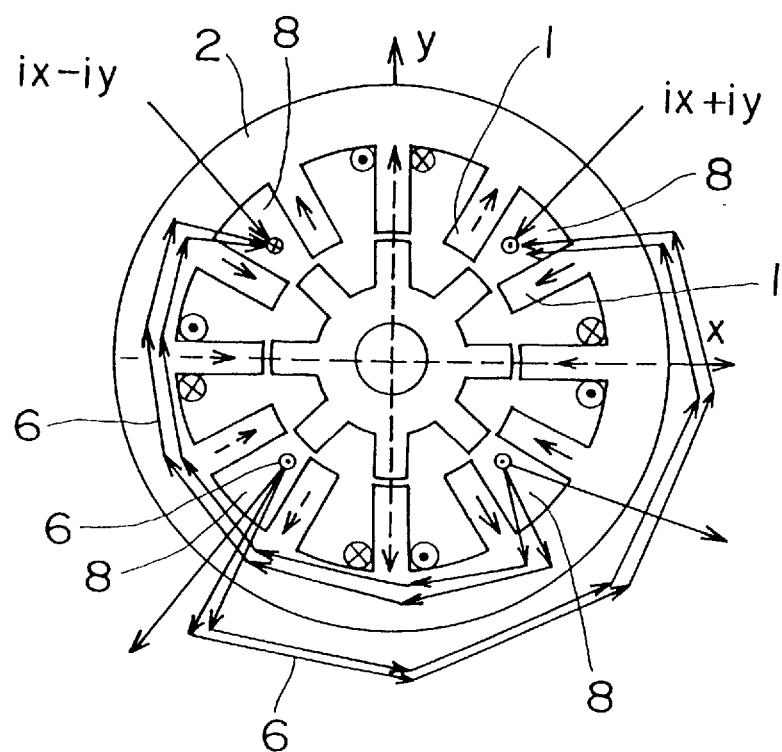
FIG. 25 is a diagram explaining the sixth method included in the second method for generating a radial force.

In the sixth system of the second method for generating radial force, as shown in FIG. 25, radial force generating windings 6 of distributed winding are wound at slot 8 between the protruding poles 1 of the stator 2 and at slot 8 opposite to the above slot 8, and radial force generating windings 6 of distributed winding in the direction perpendicular to the above radial force generating windings 6 are wound at slot 8 and at slot 8 opposite to the said slot 8.

Generally speaking, in the sixth system, first radial force generating windings which are distributed windings are placed in a slot between any of protruding poles and in the slot opposite to the said slot of the stator having a plurality of protruding poles on the inside thereof, and second radial force generating windings which are distributed windings are placed in a pair of slots which are positioned perpendicular to the pair of slots utilized for forming the first radial force generating windings and are positioned opposite to each other.

In this sixth system, two radial force generating windings 6 are provided, and as shown, for example, in FIG. 25, a current of $i_x+i_y$ is passed through one of the two radial force generating windings 6 and a current of $i_x-i_y$ is passed through another radial force generating winding 6. The radial force $F_x$ in the direction of X axis is in proportion to the current $i_x$ and the radial force $F_y$ in the direction of Y axis is in proportion to the current $i_y$.

In this sixth system, since two radial force generating windings are provided, four wirings suffice for generating a radial force and, furthermore, since the windings are provided at only four slots, a switched reluctance rotator of this system can be easily produced.

In the seventh system of the second method, a protruding pole and another protruding pole opposite to the said protruding pole are selected, and the first radial force generating windings which are distributed winding are provided at a pair of slots on one side of the above-mentioned pair of protruding poles of the stator having a plurality of protruding poles on the inside thereof; second radial force generating windings which are distributed winding are provided at a pair of slots on another side of the above-mentioned pair of the protruding poles; third radial force generating windings which are distributed winding are provided at a pair of slots on one side of a pair of protruding poles which are positioned perpendicular to the poles utilized for forming the first and second radial force generating windings and are opposite to each other; and fourth radial force generating windings which are distributed winding are provided at a pair of slots on another side of the above-mentioned pair of the protruding poles.

Specifically, for example, as shown in FIG. 26 and FIG. 27, the first to fourth radial force generating windings ①–④ are wound in the following manner. That is, for example, as shown in FIG. 26, the first radial force generating winding ① is placed as a distributed winding at a pair of slots 8 located in the right side of stator 2, said slots 8 being located adjacent to two protruding poles 1 selected from twelve protruding poles 1 on stator 2. One of the two protruding poles 1 is in Y direction and another is opposite thereto. The second radial force generating winging ② is provided so that it is adjacent to the first radial force generating winding ①. The second radial force generating winging 2 is wound as a distributed winding at a pair of slots 8 which are positioned on the opposite side to the pair of slots where the first radial force generating winding 1 is wound, with the said pair of the protruding poles 1, 1 therebetween. A current in the same direction is passed through the first radial force generating winding ① and the second radial force generating winging ②.

On the other hand, the third radial force generating winding ③ is placed as a distributed at a pair of slots located in the upper side of stator 2, said slots 8 being located adjacent to two opposite protruding poles 1, 1 which are in X direction and perpendicular to the protruding poles 1, 1 used for forming said first radial force generating winding ①. The fourth radial force generation winging ④ is provided so that it is adjacent to the third radial force generating winding ③. This fourth radial force generating winging ④ is wound as a distributed winding at a pair of slots 8 which are positioned on the opposite side to the pair of slots where the third radial force generating winding ③ is wound, with the said pair of the protruding poles 1, 1 therebetween. A current in the same direction is passed through the third radial force generating winding ③ and the fourth radial force generating winging ④.

EXAMPLE 1

Figure 28:
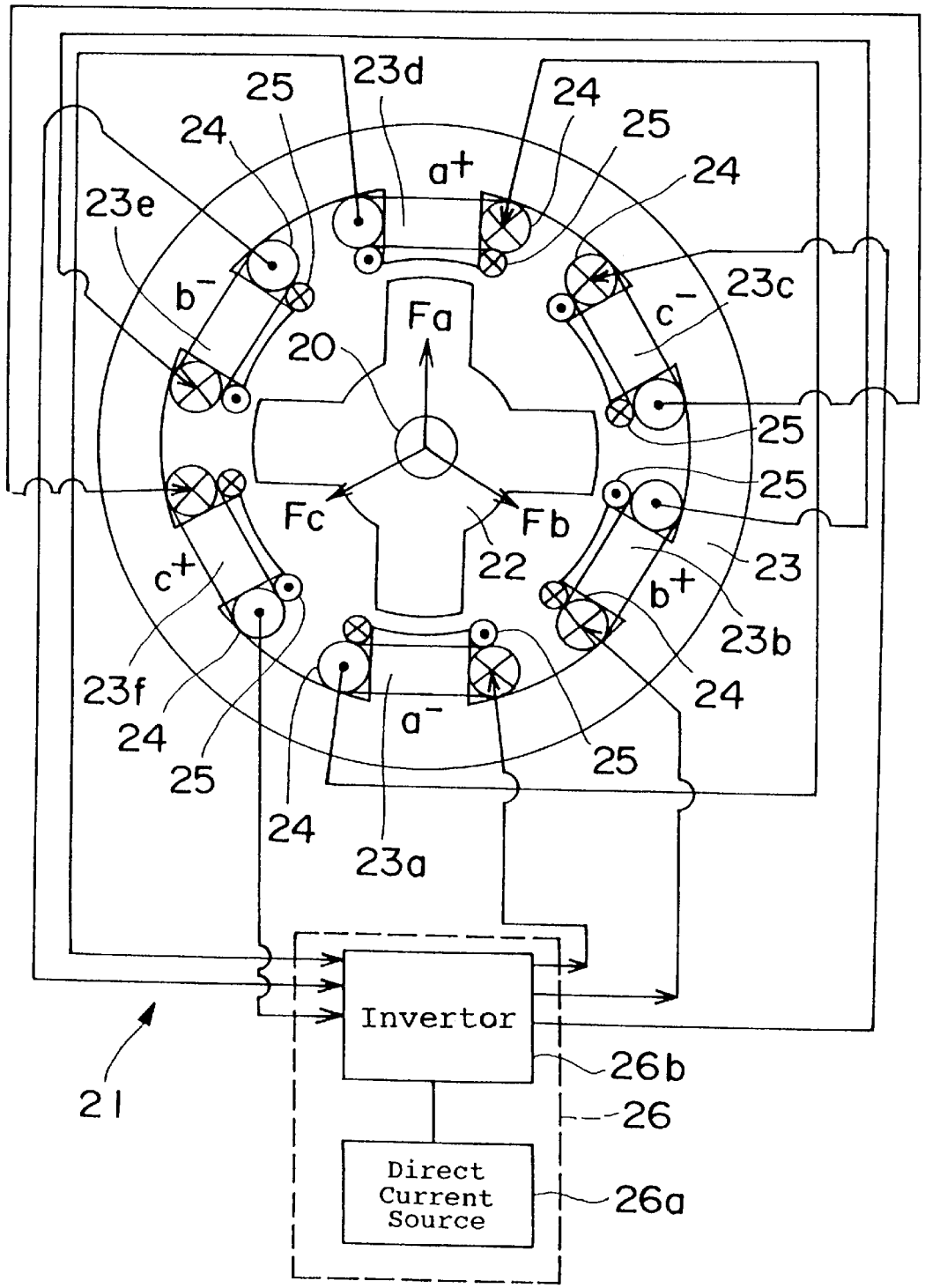
FIG. 28 is a diagram schematically explaining one example of this invention.

FIG. 28 is a diagram schematically explaining a switched reluctance motor exemplifying this invention.

As shown in FIG. 28, this switched reluctance motor 21 has rotor 22 having four protruding poles arranged in the directions perpendicular to each other and stator 23 having six protruding poles arranged at central angles of 60° to each other.

Rotating shaft 20 is pierced through the center of rotor 22.

Regarding the direction of current passed through the torque generating winding 24, it is clockwise viewing the center of rotation from the outside of the stator 23 as for the first protruding pole 23a, it is counterclockwise as for. the second protruding pole 23b, it is clockwise as for the third protruding pole 23c, it is counterclockwise as for the fourth protruding pole 23d, it is clockwise as for the fifth protruding pole 23e, and it is counterclockwise as for the sixth protruding pole 23f.

As for the wire connections of the torque generating windings 24, the torque generating winding 24 on the first protruding pole 23a is connected with the torque generating winding 24 on the fourth protruding pole 23d which is arranged opposite to the first protruding pole 23a, and another end of the torque generating winding 24 on the first protruding pole 23a and another end of the torque generating winding 24 on the fourth protruding pole 23d are connected with the electric source. The torque generating winding 24 on the second protruding pole 23b is connected with the torque generating winding 24 on the fifth protruding pole 23e which is arranged opposite to the second protruding pole 23b, and another end of the torque generating winding 24 on the second protruding pole 23b and another end of the torque generating winding 24 on the fifth protruding pole 23e are connected with the electric source. The torque generating winding 24 on the third protruding pole 23c is connected with the torque generating winding 24 on the sixth protruding pole 23f which is arranged opposite to the third protruding pole 23c, and another end of the torque generating winding 24 on the third protruding pole 23c and another end of the torque generating winding 24 on the sixth protruding pole 23f are connected with the electric source.

Regarding the wire connections of the radial force generating windings 25, it is counterclockwise viewing the center of rotation from the outside of the stator 23 as for all of the first to sixth protruding poles 23a–23f, and the current passes in this direction.

As for the wire connections of the radial force generating windings 25, the radial force generating winding 25 on the first protruding pole 23a and the radial force generating winding 25 on the fourth protruding pole 23d arranged opposite to the first protruding pole 23a are connected in series. The radial force generating winding 25 on the second protruding pole 23b and the radial force generating winding 25 on the fifth protruding pole 23e arranged opposite to the second protruding pole 23b are connected in series. The radial force generating winding 25 on the third protruding pole 23c and the radial force generating winding 25 on the sixth protruding pole 23f arranged opposite to the third protruding pole 23c are connected in series.

The electric source 26 is formed so that a distorted wave current including a direct current can be supplied to the above-mentioned torque generating winding 24. In this example, the electric source 26 is formed of direct current source 26a and invertor 26b. This invertor 26b generates a distorted three phase current wherein each of the phase differs by 30°.

The switched reluctance motor 21 of the above construction works in the following manner.

A rotating magnetic field is generated at the stator 23 by passing the distorted three phases current from the invertor 26b through windings 24, and the rotor 22 is rotated.

When the rotating shaft deviates while the rotor 22 is rotating and, for example, the protruding pole of the rotor 22 approaches the first protruding pole 23a of the stator and, on the other hand, the protruding pole of the rotor 22 gets away from the fourth protruding pole 23d of the stator 23, a current flows through the radial force generating winding 25 of the first protruding pole 23a to weaken the magnetic field at the first protruding pole 23a and, on the other hand, a current flows through the radial force generating winding 25 of the fourth protruding pole 23d to strengthen the magnetic field generated at the fourth protruding pole 23d. Therefore, when the rotating shaft deviates in such a manner that the protruding pole of the rotor 22 approaches the first protruding pole 23a, the deviation is corrected and rotation center of the rotating shaft returns to the original position.

Even if the rotating shaft of the rotor 22 deviates in any directions, the above action works and, as a result, the deviation of the rotating shaft is corrected.

The motor illustrated in this example has the following features or advantages: (1) The main shaft can be supported magnetically in a radial direction; (2) The voltage and current applied to the radial force generating winding 25 can be small; and others.

In the above example, the number of the protruding poles of the rotor 22 is four and that of the protruding poles of the stator 23 is six, but the number of the protruding poles of the rotor 22 and that of the protruding poles of the stator 23 are not critical as far as the number N of the protruding poles of the rotor 22 and the number n (n is an integer of 2 or more) of the protruding poles of the stator 23 satisfies the following equation, i.e. N=n±2. The above relation between the number of the protruding poles of the rotor and the number of the protruding poles of the stator can apply to the whole of this invention including the following Examples 2 and 3.

The shaft can be supported magnetically at a specific rotation speed by using a short circuit without an invertor connected to a radial force generating winding or by using a passive device circuit.

EXAMPLE 2

Figure 29:
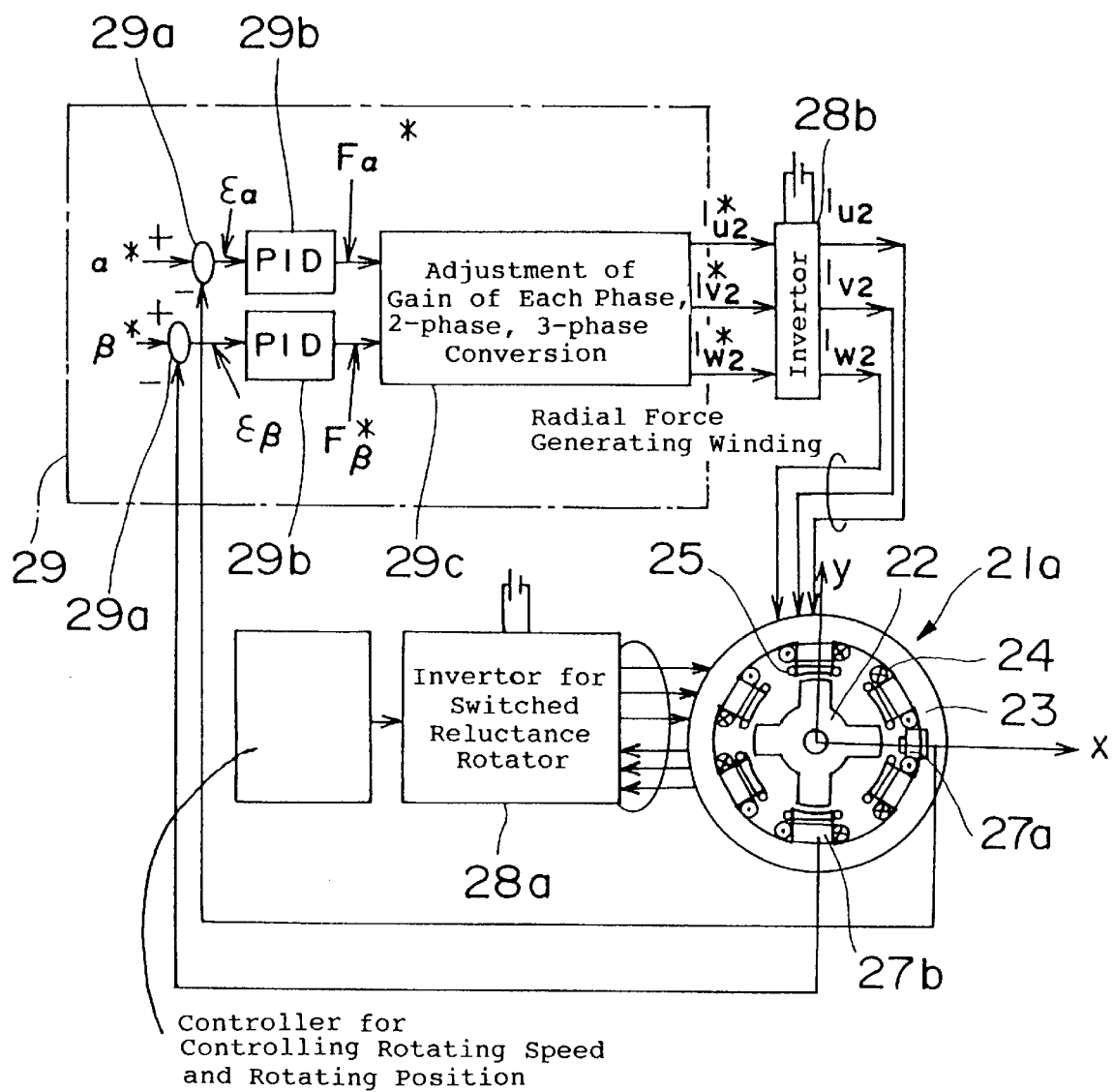
FIG. 29 is a diagram schematically explaining another example of this invention.

FIG. 29 shows a switched reluctance motor which is another example of this invention (hereinafter referred to as merely "motor"). In FIG. 29, the same reference numerals as in FIG. 28 are used for the members having the same functions as in FIG. 28.

As shown in FIG. 29, this switched reluctance motor 21a has a rotor 22 provided with four protruding poles arranged in the direction perpendicular to each other, a stator 23 provided with six protruding poles arranged so that they are at central angles of 60° to each other, two deviation detecting sensors 27a, 27b, electric sources 28a, 28b, and a controller 29.

A rotating shaft is pierced through the center of the rotor 22.

The six protruding poles of stator 23 are arranged so that two of them are opposed to each other. Each protruding poles of stator 23 is wound with torque generating winding 24 and with radial force generating winding 25.

The direction of the current passed through the torque generating winding 24 and wire connections thereof are the same as in Example 1, but the end of the torque generating winding 24 is connected to invertor 28a for the switched reluctance motor which is a part of the electric source.

The winding state of the radial force generating winding 25 is the same as in Example 1, but the end of the radial force generating winding 25 is connected to controller 29. In this motor, the radial force generating winding 25 is connected to the invertor 28b which is a part of the electric source so that three-phase alternating current is applied.

The electric source has invertor 28a for switched reluctance motor which outputs a three-phase distorted wave current including direct current to the torque generating winding 24 and invertor 28b which outputs a three-phase alternating current to the radial force generating winding 25.

The first deviation sensor 27a of the two deviation sensors 27a, 27b is arranged at the stator 23 positioned in the x direction for detecting and measuring the position of the rotating shaft of the rotor 22 deviating in the x direction. Said deviation sensor 27a outputs a detection signal to the controller 29. The second deviation sensor 27b is arranged at the stator 23 positioned in the y direction for detecting and measuring the position of the rotating shaft of the rotor 22 deviating in the y direction. Said deviation sensor 27b outputs a detection signal to the controller 29.

The controller 29 is constructed so that it calculates the deviation amount from the previously set central position of the rotating shaft of the rotor 22 and the deviating position of the rotating shaft, and calculates the necessary voltage value and current value to be output to the radial force generating winding 25 in order to make the deviation amount to be 0, and outputs an instruction signal to the invertor 28b for outputting such current. In this example, the controller 29 has a standard signal outputting part (not shown), subtraction part 29a, amplification part 29b, and gain adjusting-phase converting part 29c.

The above standard signal outputting part outputs $\alpha^*$ as the standard signal showing the position in the x direction and $\beta^*$ as the standard signal showing the position in the y direction. Signals $\alpha^*$ and $\beta^*$ are standard signals previously set as to the rotating shaft of the rotor 22. The subtraction part 29a is designed so that detected signal a which is an output from the first deviation sensor 27a and shows the position of the rotating shaft in the x direction is fed therein and a subtraction operation ($\alpha^*-\alpha$) between the standard signal $\alpha^*$ and the detection signal a is carried out. Besides, detected signal β which is output from the second deviation sensor 27b and shows the position of the rotating shaft in the y direction is also fed in said subtraction part 29a and a subtraction operation ($\beta^*-\beta$) between the standard signal $\beta^*$ and the detection signal β is carried out. The amplification part 29b is constructed so that it amplifies error signals $\epsilon\alpha$, $\epsilon\beta$ which are obtained in the subtraction part 29a and show the deviation amount of the rotating shaft, and in this example it is constructed of a proportional integral and differential controller and amplifies the error signal $\epsilon$ according to the frequency and outputs instruction values $F\alpha^*$ and $F\beta^*$ which show the force in radial direction. The above-mentioned instruction values $F\alpha^*$ and $F\beta^*$ are fed in the gain adjusting-phase converting part 29c. Momentary voltage value/momentary current value output to the radial force generating winding 25 are calculated therein and instruction signals ($i_{u2}^*$, $i_{v2}^*$, $i_{w2}^*$) are output therefrom to invertor 28b.

The above invertor supplies currents in both the positive and negative directions ($i_{u2}$, $i_{v2}$, $i_{w2}$) having the given momentary voltage value/momentary current value to the radial force generating winding 25 in accordance with the instruction signal from the controller 29.

In the motor of the above construction, the deviation of the rotating shaft of the rotor 22 is corrected in the following procedure.

Figure 30:
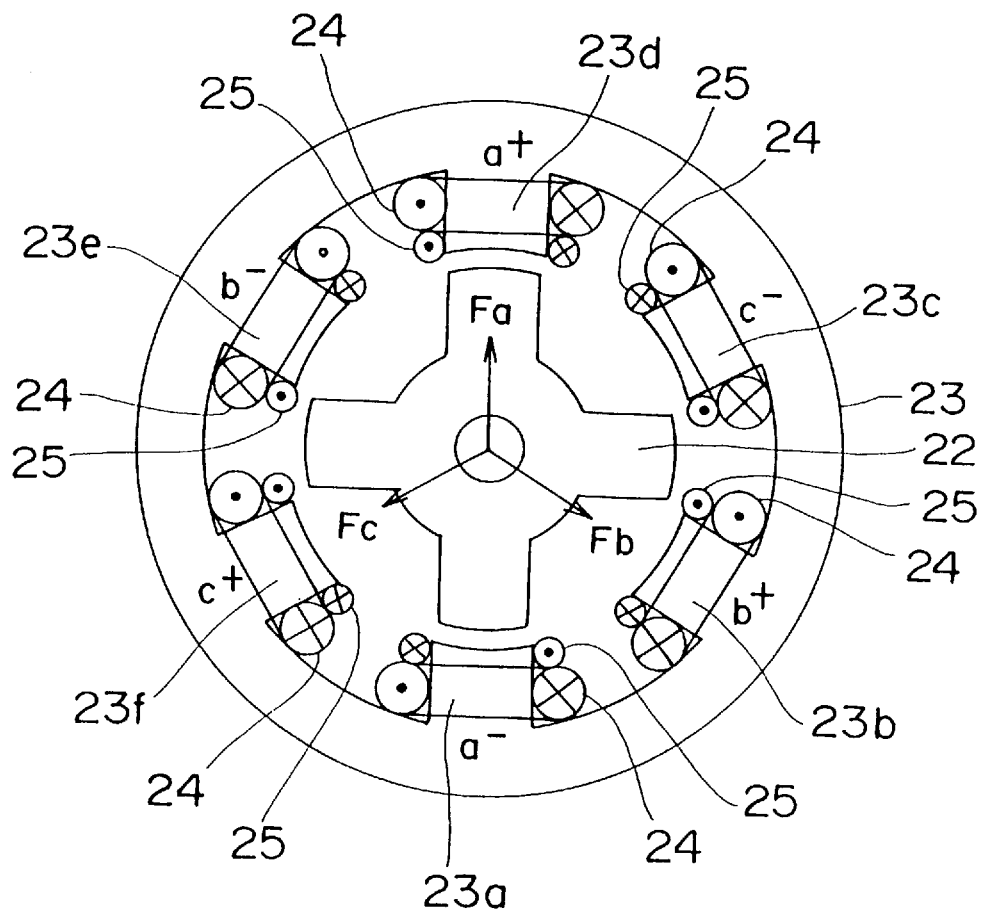
FIG. 30 is a diagram schematically showing the rotor and the stator in a switched reluctance motor shown in FIG. 29.

As shown in FIG. 30, a distorted wave current including a direct current is passed through the torque generating winding 24 on the protruding poles of the stator 23 from the invertor 28a for the switched reluctance motor. Since the current is of one direction, the current flows in the direction as shown in FIG. 30 or is 0 in each torque generating winding 24. Therefore, the magnetic poles $a^+$, $b^+$ and $c^+$ among six magnetic poles are always excited to S pole. On the other hand, $a^-$, $b^-$ and $c^-$ are excited to N pole. Here, when a current of positive direction is passed through the radial force generating winding 25 on the magnetic pole $a^+$ from the invertor, the current flows in the same direction as the winding direction of the torque generating winding 24, and therefore, the magnetic fluxes become stronger with each other and the magnetic flux density increases. On the other hand, since the direction of magnetomotive force of the torque generating winding 24 and the direction of magnetomotive force of the radial force generating winding 25 are opposite to each other at the magnetic pole of $a^-$, the magnetic force is weakened and the magnetic flux density decrease. As a result, a force to attract to the magnetic pole $a^+$ is generated in the rotor 22. In FIG. 30, a radial force in the direction indicated by Fa is generated as mentioned above.

Furthermore, for generating a force in radial direction (radial force) in the direction opposite to Fa, a current of the opposite direction is passed through the radial force generating winding 25. Therefore, a current is passed through the torque generating winding 24 in only one direction while a current is passed through the radial force generating winding 25 in both directions.

In the same principle as mentioned above, forces in $F_b$ direction, $F_c$ direction and the direction opposite to them can be generated by the interaction of the magnetic fluxes generated by the torque generating winding 24 and the radial force generating winding 25 of the magnetic poles b and c in FIG. 30. By controlling the magnitude of vectors of these forces in the radial direction, namely, radial forces, the magnitude and the direction of the radial force generated at the rotor 22 can be controlled as a combination of the vectors.

If the current passed through the torque generating winding 24 is 0, any radial forces are not generated in the direction of the vector. Therefore, when currents of at least two phases are not 0, vectors of radial forces in two directions can always be generated, and, as a result, the magnitude and direction of the radial forces acting on the rotor 22 can be arbitrarily selected.

In this example, when rotor 22 rotates at a high speed and when the rotating shaft deviates, the deviation can be corrected after by the above-mentioned principle.

This example has the characteristic that the radial force generating winding 25 is differential to the torque generating winding 24. Therefore, the motor shown in this example has the following advantages and characteristics: (1) no inductive electromotive voltage due to the magnetic flux of the torque generating winding 24 is generated, and therefore, the terminal voltage necessary for passing current through the radial force generating winding 25 can be very low and therefore a large power is not needed; (2) when the radial force is not needed to generate, the current passed through the radial force generating winding 25 can be 0 and there is no need to apply a bias current thereto, and, thus, electrical construction can be simplified; (3) the wiring is simple, namely, in a switched reluctance rotator wherein currents are independently controlled by applying voltages in both the positive and negative directions to windings on the respective magnetic poles thereof, twelve wirings with an invertor are necessary, while, in this example, only six wirings for the torque generating windings and three wirings for radial force generating windings are necessary; (4) needed capacity of a converter can be small, namely, in a switched reluctance rotator wherein the currents are independently controlled by applying voltages in both the positive and negative directions to windings of respective magnetic poles thereof, a semiconductor power converter of relatively large capacity is necessary for converting the power for the respective windings, and further, a high speed and high accuracy current response is necessary for levitative controlling, while, in this example, a conventional invertor, especially a voltage type invertor suffices as an electric source; (5) when deviation amount of the rotation center of the rotor 22 is small, the radial force is nearly the product of current of the torque generating winding 24, current of the radial force generating winding 25 and partial differential of the mutual inductance of them for the position in the radial direction, and, therefore, a good linearity is obtained in a wider area around the rotation center compared with a conventional switched reluctance rotator; (6) owing to the winding direction of the torque generating winding 24 of phase c as shown in FIG. 30, alternation of the direction of magnetic flux passing the rotor 22 is small and therefore iron loss is small. When the torque generating winding 24 of phase c is connected inversely as shown in FIG. 28, some iron loss occurs, but three-phase symmetry is obtained and therefore, the wiring is simple.

EXAMPLE 3

This Example relates to a switched reluctance motor (abbreviated to "motor") in which the radial force generated due to a machining error of the iron core of stator 23, error between phases of windings and other errors is canceled by feedforward controlling without using deviation sensor.

Figure 31:
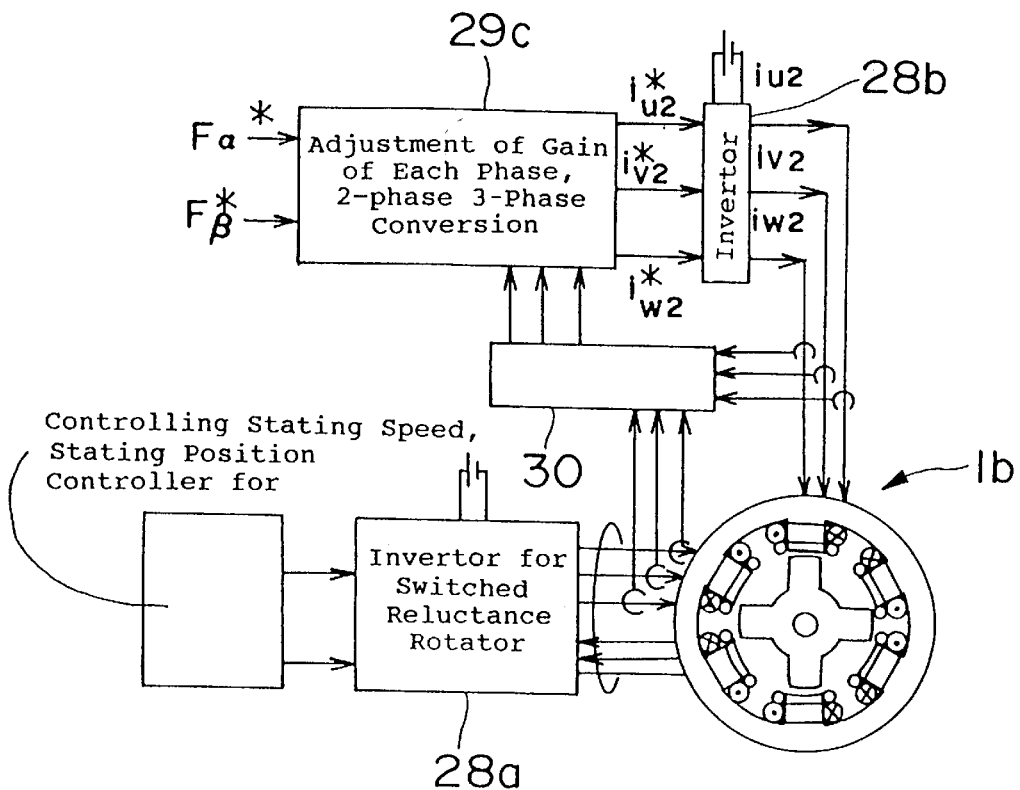
FIG. 31 is a diagram schematically explaining further another example of this invention.
Figure 32:
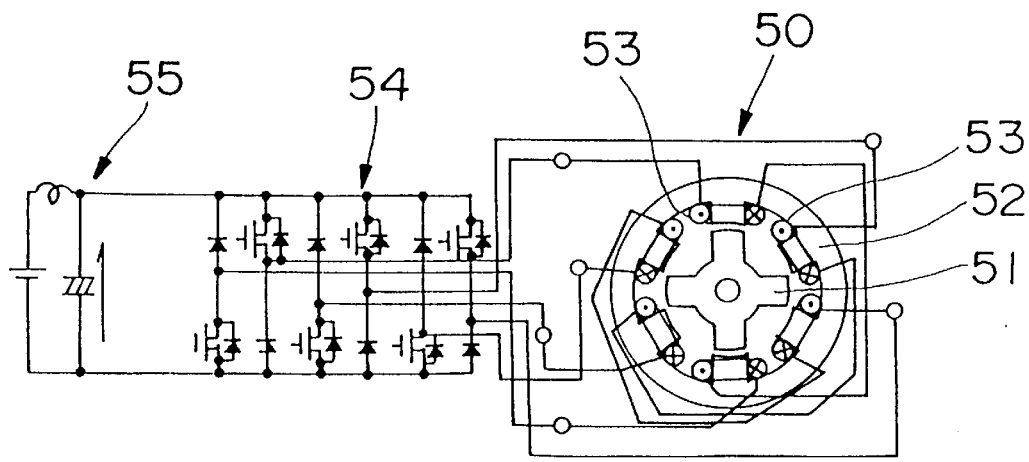
FIG. 32 is a schematic diagram of a conventional general switched reluctance motor.

As shown in FIG. 31, this switched reluctance motor 21b has the same construction as of Example 2, except that the stator 23 is not provided with a deviation sensor, but has a deviation observer 30 which detects the amount of deviation generated at the rotor 22 by observing the voltage value and/or the current value passed through the torque generating winding 24 and observing the voltage value and/or the current value passed through the radial force generating winding 25.

The motor illustrated in FIG. 31 has the following characteristics and advantages in addition to those shown in Example 2; (1) no sensor is needed; (2) the motor has a simple construction; (3) the motor can be produced at a low cost; (4) the motor has a high reliability; (5) the motor can be made in a small and compact form.

Industrial Applicability (1) This invention can provide a switched reluctance rotator in which the rotating shaft of the rotor can be electromaquentically supported, and furthermore, there occurs no electromagnetic vibration since the deviation of the rotating shaft is corrected, and said switched reluctance rotator can rotate at an ultrahigh speed.

(2) In addition to the technical effects of (1), the switched reluctance rotator according to this invention can be made in a small and compact form since the voltage and current passed through the radial force generating winding is compact.

(3) In addition to the technical effects of (1), according to this invention, accurate and active magnetic support is possible.

(4) In addition to the technical effects of (1), according to this invention, since there is no need to provide a deviation sensor at the stator, the construction can be simplified, and a rotator having a high reliability can be produced at a low cost.

We claim:

1. A switched reluctance rotator comprising:

a rotor provided with a plurality of protruding rotor poles;

a stator arranged around the rotor and provided with protruding stator poles;

torque generating windings, which generate a rotation torque at the rotor, provided on the respective protruding poles of the stator; and differential windings provided around the rotor, which impart a unidirectional radial force to the rotor;

wherein on opposite stator poles the differential windings are wound in the same sense when the torque generating windings are wound in the opposite sense, and the differential windings are wound in the opposite sense when the torque generating windings are wound in the same sense; and wherein the differential windings are provided on the respective protruding poles of the stator.

2. A switched reluctance rotator according to claim 1, further comprising:

deviation detector means for detecting a deviation of the rotor in the radial direction and outputting a detection signal; and controlling means for receiving the detection signal, processing the detection signal and outputting a controlling signal to be sent to the differential windings.

3. A switched reluctance rotator according to claim 2 further comprising a current source and invertor means, connected with the current source, for sending a current to the differential windings in accordance with an instruction from the control means, wherein:

said deviation detector means comprises first deviation sensor means for sensing a position of the rotor in the X direction and for outputting a first deviation signal, and second deviation sensor for sensing a position of the rotor in the Y direction and for outputting a second deviation signal; and said control means comprises:
standard signal outputting means for outputting a X position standard signal and a Y position standard signal;
first subtraction means for receiving the X position standard signal, the first deviation signal, subtracting the first deviation signal from the X position standard signal to obtain a first error signal and outputting the first error signal;
second subtraction means for receiving the Y position standard signal, the second deviation signal, subtracting the second deviation signal from the Y position standard signal to obtain a second error signal and outputting the second error signal;
first amplifying means for receiving and amplifying the first error signal to obtain a first instruction value, and outputting the first instruction value;
second amplifying means for receiving and amplifying the second error signal to obtain a second instruction value, and outputting the second instruction value; and
gain adjusting-phase converting means for receiving the first instruction value and the second instruction value, calculating a momentary voltage value or a momentary current value, and outputting an instruction signal showing the momentary voltage value or the momentary current value to the invertor means.

4. A switched reluctance rotator according to claim 3, wherein:
the protruding poles of the stator are 12 (twelve) in number;
the protruding poles of the stator are arranged at regular angles around the rotor;
the differential windings comprise, in order, a first winding, second winding, a third winding, a fourth winding, a fifth winding, a sixth winding, a seventh winding, an eighth winding, a ninth winding, a tenth winding, an eleventh winding and a twelfth winding, said first to twelfth windings corresponding to the respective twelve protruding poles of the stator and each having two current terminals;
one current terminal of the first winding is electrically connected with one current terminal of the seventh winding, the other current terminal of the first winding is electrically connected with the inverter means, and the other current terminal of the seventh winding is electrically connected with a current return so as to generate a first radial force of one direction by both of the first winding and the seventh winding;
one current terminal of the second winding is electrically connected with one current terminal of the eighth winding, the other current terminal of the second winding is electrically connected with the invertor means, and the other current terminal of the eighth winding is electrically connected with a current return so as to generate a second radial force of one direction by both of the second winding and the eighth winding;
one current terminal of the third winding is electrically connected with one current terminal of the ninth winding, the other current terminal of the third winding is electrically connected with the invertor means, and the other current terminal of the ninth winding is electrically connected with a current return so as to generate a third radial force of one direction by both of the third winding and the ninth winding;
one current terminal of the fourth winding is electrically connected with one current terminal of the tenth winding, the other current/terminal of the fourth winding is electrically connected with the invertor means, and the other current terminal of the tenth winding is electrically connected with a current return so as to generate a fourth radial force of one direction by both of the fourth winding and the tenth winding;
one current terminal of the fifth winding is electrically connected with one current terminal of the eleventh winding, the other current terminal of the fifth winding is electrically connected with the invertor means, and the other current terminal of the eleventh winding is electrically connected with a current return so as to generate a fifth radial force of one direction by both of the fifth winding and the eleventh winding;
one current terminal of the sixth winding is electrically connected with one current terminal of the twelfth winding, the other current terminal of the sixth winding is electrically connected with the invertor means, and the other current terminal of the twelfth winding is electrically connected with a current return so as to generate a sixth radial force of one direction by both of the sixth winding and the twelfth winding.

5. A switched reluctance rotator according to claim 4, the gain adjusting-phase converting means including vector distributor means for distributing the first instruction value and the second instruction value into a first instruction vector for the first winding, the fourth winding, the seventh winding and the tenth winding, a second instruction vector for the second winding, the fifth winding, the eighth winding and the eleventh winding, and a third instruction vector for the third winding, the sixth winding, the ninth winding and the twelfth winding; the first instruction vector being further distributed into a first instruction vector component $F_{AX}$ and a first instruction vector component $F_{AY}$ wherein the vector component $F_{AX}$ and the vector component $F_{AY}$ are orthogonal, and the first and second vector components $F_{AX}$ and $F_{AY}$ each correspond to the first and fourth radial forces; the second instruction vector being further distributed into a second instruction vector component $F_{BX}$ and a second instruction vector component $F_{BY}$ wherein the vector component $F_{BX}$ and the vector component $F_{BY}$ are orthogonal, and the first and second vector components $F_{BX}$ and $F_{BY}$ each correspond to the second and fifth radial forces; and the third instruction vector being distributed into a third instruction vector component $F_{CX}$ and a third instruction vector component $F_{CY}$ wherein the vector component $F_{CX}$ and the vector component $F_{CY}$ are orthogonal, and the first and second vector components $F_{CX}$ and $F_{CX}$ each correspond to the third and sixth radial forces.

6. A switched reluctance rotator according to claim 5 wherein the gain adjusting-phase converting means comprises first operation means for performing $F_k \mu_0 N^2 S/(2L^2 i_{k0})$ to obtain $i_{ks}$ when the relation between the current and the magnetic flux interlinkage number is linear and the dynamic range of the radial force is narrow, and outputting the instruction signal $i_{ks}$ to the invertor means, wherein k is AX, AY, BX, BY, CX or CY, $F_k$ is the instruction vector, $\mu_0$ is $4\pi \times 10^{-7}$ H/m, N indicates the winding number of the windings, S indicates an area at a gap between the protruding pole of the rotor and that of the stator, L is the inductance, and $i_{k0}$ is a current flowing in a pair of the windings facing each other.

7. A switched reluctance rotator according to claim 5 wherein the gain adjusting-phase converting means comprises first operation means for solving $F_k \times 2\mu_0\ N^2 S/L^2 = (i_{k0}^2 + i_{ks}^2) - (i_{k0}^2 - i_{ks}^2)$ to obtain $i_{ks}$ when the relation between the current and the magnetic flux interlinkage number is not linear and the dynamic range of the radial force is wide, and outputting the instruction signal $i_{ks}$ to the invertor means, wherein k is AX, AY, BX, BY, CX or CY, $F_k$ is the instruction vector, $\mu_0$ is $4\pi \times 10^{-7}$H/m, N indicates the winding number of the windings, S indicates an area at a gap between the protruding pole of the rotor and that of the stator, L is the inductance, and $i_{k0}$ is a current flowing in a pair of the windings facing each other.

8. A switched reluctance rotator according to claim 5 wherein the gain adjusting-phase converting means comprises first operation means for performing $F_k \times 2\mu_0 N^2 S$ to obtain a differential magnetic flux interlinkage number $(\Psi_+^2 - \Psi_-^2)$ * when the relation between the current and the magnetic flux interlinkage number is not linear and the dynamic range of the radial force is wide, comparing the differential magnetic flux interlinkage number $(\Psi_+^2 - \Psi_-^2)$ * with an estimated differential magnetic flux interlinkage number $(\Psi_+^2 - \Psi_-^2)$ to cause unequilibrium of currents wherein k is AX, AY, BX, BY, CX or CY, $F_k$ is the instruction vector, $\mu_0$ is $4\pi \times 10^{-7}$H/m, N indicates the winding number of the windings, and S indicates an area at a gap between the protruding pole of the rotor and that of the stator.

9. A switched reluctance rotator according to claim 2, wherein:

the protruding poles of the stator are 12 (twelve) in number;

the protruding poles of the stator are arranged at regular angles around the rotor;

the differential windings comprise, in order, a first winding, second winding, a third winding, a fourth winding, a fifth winding, a sixth winding, a seventh winding, an eighth winding, a ninth winding, a tenth winding, an eleventh winding and a twelfth winding, said first to twelfth windings corresponding to the respective twelve protruding poles of the stator and each having two current terminals;

one current terminal of the first winding is electrically connected with one current terminal of the seventh winding, the other current terminal of the first winding is electrically connected with a current source, and the other current terminal of the seventh winding is electrically connected with a current return so as to generate a first radial force of one direction by both of the first winding and the seventh winding;

one current terminal of the second winding is electrically connected with one current terminal of the eighth winding, the other current terminal of the second winding is electrically connected with a current source, and the other current terminal of the eighth winding is electrically connected with a current return so as to generate a second radial force of one direction by both of the second winding and the eighth winding;

one current terminal of the third winding is electrically connected with one current terminal of the ninth winding, the other current terminal of the third winding is electrically connected with a current source, and the other current terminal of the ninth winding is electrically connected with a current return so as to generate a third radial force of one direction by both of the third winding and the ninth winding;

one current terminal of the fourth winding is electrically connected with one current terminal of the tenth winding, the other current terminal of the fourth winding is electrically connected with a current source, and the other current terminal of the tenth winding is electrically connected with a current return so as to generate a fourth radial force of one direction by both of the fourth winding and the tenth winding;

one current terminal of the fifth winding is electrically connected with one current terminal of the eleventh winding, the other current terminal of the fifth winding is electrically connected with a current source, and the other current terminal of the eleventh winding is electrically connected with a current return so as to generate a fifth radial force of one direction by both of the fifth winding and the eleventh winding;

one current terminal of the sixth winding is electrically connected with one current terminal of the twelfth winding, the other current terminal of the sixth winding is electrically connected with a current source, and the other current terminal of the twelfth winding is electrically connected with a current return so as to generate a sixth radial force of one direction by both of the sixth winding and the twelfth winding.

10. A switched reluctance rotator according to claim 2, wherein:

the protruding poles of the stator are 12 (twelve) in number;

the protruding poles of the stator are arranged at regular angles around the rotor;

the differential windings comprise, in order, a first winding, second winding, a third winding, a fourth winding, a fifth winding, a sixth winding, a seventh winding, an eighth winding, a ninth winding, a tenth winding, an eleventh winding and a twelfth winding, said first to twelfth windings corresponding to the respective twelve protruding poles of the stator and each having two current terminals;

one current terminal of the first winding is electrically connected with one current terminal of the fourth winding, the other current terminal of the fourth winding is electrically connected with one current terminal of seventh winding, the other current terminal of the seventh winding is electrically connected with one current terminal of the tenth winding, the other current terminal of the first winding is electrically connected with a current source, and the other current terminal of the tenth winding is electrically connected with a current return so as to generate a first radial force of one direction by both of the first winding and the seventh winding and a fourth radial force of one direction by both of the fourth winding and the tenth winding;

one current terminal of the second winding is electrically connected with one current terminal of the fifth winding, the other current terminal of the fifth winding is electrically connected with one current terminal of eighth winding, the other current terminal of the eighth winding is electrically connected with one current terminal of the eleventh winding, the other current terminal of the second winding is electrically connected with a current source, and the other current terminal of the eleventh winding is electrically connected with a current return so as to generate a second radial force of one direction by both of the second winding and the eighth winding and a fifth radial force of one direction by both of the fifth winding and the eleventh winding; and one current terminal of the third winding is electrically connected with one current terminal of the sixth winding, the other current terminal of the sixth winding is electrically connected with one current terminal of ninth winding, the other current terminal of the ninth winding is electrically connected with one current terminal of the twelfth winding, the other current terminal of the third winding is electrically connected with a current source, and the other current terminal of the twelfth winding is electrically connected with a current return so as to generate a third radial force of one direction by both of the third winding and the ninth winding and a sixth radial force of one direction by both of the sixth winding and the twelfth winding.

11. A switched reluctance rotator according to claim 2, wherein:

the protruding poles of the stator are 12 (twelve) in number;

the protruding poles of the stator are arranged at regular angles around the rotor;

the differential windings comprise, in order, a first winding, second winding, a third winding, a fourth winding, a fifth winding, a sixth winding, a seventh winding, an eighth winding, a ninth winding, a tenth winding, an eleventh winding and a twelfth winding, said first to twelfth windings corresponding to the respective twelve protruding poles of the stator and each having two current terminals;

one current terminal of the first winding is electrically connected with one current terminal of the second winding, the other current terminal of the second winding is electrically connected with one current terminal of third winding, the other current terminal of the third winding is electrically connected with one current terminal of the seventh winding, the other current terminal of the seventh winding is electrically connected with one current terminal of the eighth winding, the other current terminal of the eighth winding is electrically connected with one current terminal of the ninth winding, the other current terminal of the first winding is electrically connected with a current source, and the other current terminal of the ninth winding is electrically connected with a current return so as to generate a summed radial force of one direction by the first to third windings and the seventh to ninth windings;

one current terminal of the fourth winding is electrically connected with one current terminal of the fifth winding, the other current terminal of the fifth winding is electrically connected with one current terminal of sixth winding, the other current terminal of the sixth winding is electrically connected with one current terminal of the tenth winding, the other current terminal of the tenth winding is electrically connected with one current terminal of the eleventh winding, the other current terminal of the eleventh winding is electrically connected with one current terminal of the twelfth winding, the other current terminal of the fourth winding is electrically connected with a current source, and the other current terminal of the twelfth winding is electrically connected with a current return so as to generate a summed radial force of one direction by the fourth to sixth windings and the tenth to twelfth windings.

12. A switched reluctance rotator comprising:

a rotor provided with a plurality of protruding rotor poles;

a stator arranged around the rotor and provided with protruding stator poles;

torque generating windings, which generate a rotation torque at the rotor, provided on the respective protruding poles of the stator; and differential windings provided around the rotor, which impart a unidirectional radial force to the rotor;

wherein on opposite stator poles the differential windings are wound in the same sense when the torque generating windings are wound in the opposite sense, and the differential windings are wound in the opposite sense when the torque generating windings are wound in the same sense; and wherein the differential windings are provided between the protruding poles of the stator.

13. A switched reluctance rotator according to claim 12, further comprising:

deviation detector means for detecting a deviation of the rotor in the radial direction and outputting a detection signal; and controlling means for receiving the detection signal, processing the detection signal and outputting a controlling signal to the differential windings.

14. A switched reluctance rotator according to claim 13 further comprising a current source and invertor means, connected with the current source, for sending a current to the differential windings in accordance with an instruction from the control means, wherein:

said deviation detector means comprises first deviation sensor means for sensing a position of the rotor in the X direction and for outputting a first deviation signal, and second deviation sensor for sensing a position of the rotor in the Y direction and for outputting a second deviation signal; and said control means comprises:

standard signal outputting means for outputting a X position standard signal and a Y position standard signal;

first subtraction means for receiving the X position standard signal, the first deviation signal, subtracting the first deviation signal from the X position standard signal to obtain a first error signal and outputting the first error signal;

second subtraction means for receiving the Y position standard signal, the second deviation signal, subtracting the second deviation signal from the Y position standard signal to obtain a second error signal and outputting the second error signal;

first amplifying means for receiving and amplifying the first error signal to obtain a first instruction value, and outputting the first instruction value;

second amplifying means for receiving and amplifying the second error signal to obtain a second instruction value, and outputting the second instruction value; and gain adjusting-phase converting means for receiving the First instruction value and the second instruction value, calculating a momentary voltage value or a momentary current value, and outputting an instruction signal showing the momentary voltage value or the momentary current value to the invertor means.

15. A switched reluctance rotator according to claim 13, wherein:

the protruding poles of the stator are arranged at regular angles around the rotor and comprise, in order, a first protruding pole, a second protruding pole, a third protruding pole, a fourth protruding pole, a fifth protruding pole, a sixth protruding pole, a seventh protruding pole, an eighth protruding pole, a ninth protruding pole, a tenth protruding pole, an eleventh protruding pole and a twelfth protruding pole;

the differential windings comprise, in order, a first distributed winding being placed between the first protruding pole and the second pole, a second distributed winding being placed between the fourth protruding pole and the fifth protruding pole, a third distributed winding being placed between the seventh protruding pole and the eighth protruding pole, and a fourth distributed winding being placed between the tenth protruding pole and the eleventh protruding pole, said first to fourth distributed windings each having two current terminals;

one current terminal of the first distributed winding is electrically connected with one current terminal of the third distributed winding, the other current terminal of the first distributed winding is connected with a current source, and the other current terminal of the third distributed winding is connected with a current return so as to generate a first radial force of one direction by both the first distributed winding and the third distributed winding; and one current terminal of the second distributed winding is electrically connected with one current terminal of the fourth distributed winding, the other current terminal of the second distributed winding is connected with a current source, and the other current terminal of the fourth distributed winding is connected with a current return so as to generate a second radial force of one direction by both the second distributed winding and the fourth distributed winding.

16. A switched reluctance rotator according to claim 13, wherein:

the protruding poles of the stator are arranged at regular angles around the rotor and comprise, in order, a first protruding pole, a second protruding pole, a third protruding pole, a fourth protruding pole, a fifth protruding pole, a sixth protruding pole, a seventh protruding pole, an eighth protruding pole, a ninth protruding pole, a tenth protruding pole, an eleventh protruding pole and a twelfth protruding pole;

the differential windings comprise, in order, a first distributed winding being placed between the first protruding pole and the second pole, a second distributed winding being placed between the second protruding pole and the third protruding pole, a third distributed winding being placed between the fourth protruding pole and the fifth protruding pole, and a fourth distributed winding being placed between the fifth protruding pole and the sixth protruding pole, a fifth distributed winding being placed between the seventh protruding pole and the eighth protruding pole, a sixth distributed winding being placed between the eighth protruding pole and the ninth protruding pole, a seventh distributed winding being placed between the tenth protruding pole and the eleventh protruding pole, and an eighth distributed winding being placed between the eleventh protruding pole and the twelfth protruding pole, said first to eighth distributed windings each having two current terminals;

one current terminal of the first distributed winding is electrically connected with one current terminal of the sixth distributed winding, the other current terminal of the first distributed winding is connected with a current source, and the other current terminal of the sixth distributed winding is connected with a current return, one current terminal of the second distributed winding is electrically connected with one current terminal of the fifth distributed winding, the other current terminal of the second distributed winding is connected with a current source, and the other current terminal of the fifth distributed winding is connected with a current return so as to generate a first radial force of one direction by the first, sixth, second and fifth distributed windings; and one current terminal of the third distributed winding is electrically connected with one current terminal of the eighth distributed winding, the other current terminal of the third distributed winding is connected with a current source, and the other current terminal of the eighth distributed winding is connected with a current return, one current terminal of the fourth distributed winding is electrically connected with one current terminal of the seventh distributed winding, the other current terminal of the fourth distributed winding is connected with a current source, and the other current terminal of the seventh distributed winding is connected with a current return so as to generate a second radial force of one direction by the third, eighth, fourth and seventh distributed windings.

* * * * *